(12) United States Patent
Will et al.

(10) Patent No.: US 9,775,450 B2
(45) Date of Patent: Oct. 3, 2017

(54) WALL ANCHOR ASSEMBLIES AND RELATED WALL MOUNT SYSTEMS

(71) Applicant: THE HILLMAN GROUP, INC., Cincinnati, OH (US)

(72) Inventors: Gary E. Will, Gold Canyon, AZ (US); Byron K. Grice, Phoenix, AZ (US); Dale G. Malott, Middlebury, IN (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 0 days.

(21) Appl. No.: 15/195,168

(22) Filed: Jun. 28, 2016

(65) Prior Publication Data
US 2017/0000270 A1    Jan. 5, 2017

Related U.S. Application Data

(60) Provisional application No. 62/186,908, filed on Jun. 30, 2015.

(51) Int. Cl.
*A47G 1/20* (2006.01)
*A47B 96/02* (2006.01)
(Continued)

(52) U.S. Cl.
CPC .............. *A47G 1/20* (2013.01); *A47B 96/02* (2013.01); *F16B 15/0023* (2013.01);
(Continued)

(58) Field of Classification Search
CPC ........ A47G 1/20; A47B 96/02; A47B 96/024; A47F 7/14; F16B 15/0023; F16B 45/00; F16M 13/02
(Continued)

(56) References Cited

U.S. PATENT DOCUMENTS 251,616 A    12/1881    McGill
297,173 A    4/1884    Seliger
(Continued)

FOREIGN PATENT DOCUMENTS

GB         676903        8/1952
WO    WO 99/52741    10/1999
(Continued)

OTHER PUBLICATIONS

PCT, International Search Report and Written Opinion, International Application No. PCT/US2016/039719; dated Nov. 10, 2016, 10 pages.

*Primary Examiner* — Paola Agudelo
(74) *Attorney, Agent, or Firm* — Thompson Hine LLP

(57) ABSTRACT

An anchor assembly for hanging an object on a wall includes a first anchor component and a second anchor component. The second anchor component is pivotably associated with the first anchor component for movement between an anchoring orientation and a non-anchoring orientation to enable staged installation of the anchor assembly into a wall. At least one wall penetrating retainer extends from each of the first and second anchor components. When the second anchor component is in the anchoring orientation a curved configuration of the wall penetrating extent of the retainer of the second anchor component opposes a curved configuration of the wall penetrating extent of the retainer of the first anchor component to form a jaw-type arrangement.

43 Claims, 20 Drawing Sheets

(51) Int. Cl.
*F16B 15/00* (2006.01)
*F16M 13/02* (2006.01)
*F16B 45/00* (2006.01)

(52) U.S. Cl.
CPC ............ *A47B 96/024* (2013.01); *F16B 45/00* (2013.01); *F16M 13/02* (2013.01)

(58) Field of Classification Search
USPC ...................................................... 248/218.1
See application file for complete search history.

(56) References Cited

U.S. PATENT DOCUMENTS

| | | | |
|---|---|---|---|
| 371,205 A | 10/1887 | McConnoughay | |
| 444,933 A | 1/1891 | Barnes | |
| 769,794 A * | 9/1904 | Fowler | A47G 1/16 248/489 |
| 795,704 A | 7/1905 | Jones | |
| 874,412 A | 12/1907 | Lewis | |
| 938,998 A | 11/1909 | Evans | |
| 965,151 A | 7/1910 | Benjamin | |
| 998,015 A | 7/1911 | Kopsa | |
| 1,306,114 A * | 6/1919 | Koval | E06B 9/50 248/267 |
| 1,343,855 A | 6/1920 | Tyler | |
| 1,425,873 A | 8/1922 | Lineaweaver | |
| 1,802,934 A | 4/1931 | Balch | |
| 2,295,370 A | 9/1942 | Tritt | |
| 2,317,368 A | 4/1943 | Frey | |
| 2,334,700 A | 11/1943 | Frey | |
| 2,539,825 A | 1/1951 | Genua | |
| 2,751,807 A * | 6/1956 | Harre | F16B 15/00 24/711.3 |
| 3,020,602 A | 2/1962 | Siering | |
| 3,298,651 A * | 1/1967 | Passer | A47G 1/20 248/217.2 |
| 3,685,778 A | 8/1972 | Berns | |
| 3,861,631 A | 1/1975 | Shorin | |
| 3,912,211 A | 10/1975 | Topf | |
| 3,926,394 A | 12/1975 | Mauceri et al. | |
| 3,966,157 A * | 6/1976 | Corral | A47G 1/20 248/217.3 |
| 3,995,822 A | 12/1976 | Einhorn et al. | |
| 4,017,048 A | 4/1977 | Einhorn | |
| 4,039,138 A | 8/1977 | Einhorn | |
| 4,040,149 A | 8/1977 | Einhorn | |
| 4,124,189 A | 11/1978 | Einhorn | |
| 4,228,982 A | 10/1980 | Sellera | |
| 4,300,745 A * | 11/1981 | Peterson | A47H 1/102 248/216.1 |
| 4,333,625 A | 6/1982 | Haug | |
| 4,422,608 A | 12/1983 | Hogg | |
| 4,458,387 A | 7/1984 | Pearson | |
| 4,485,995 A | 12/1984 | Hogg | |
| 4,572,380 A | 2/1986 | Langwell | |
| 4,613,108 A | 9/1986 | Sundstrom et al. | |
| 4,655,423 A | 4/1987 | Schavilje et al. | |
| 4,719,917 A * | 1/1988 | Barrows | A61B 17/0644 411/447 |
| 5,149,037 A | 9/1992 | Smith | |
| 5,267,719 A * | 12/1993 | Keller | A47G 1/20 248/475.1 |
| 5,484,126 A | 1/1996 | Kitchin | |
| 5,878,988 A | 3/1999 | Rakower | |
| 6,126,126 A * | 10/2000 | McKiernan, Jr. | A47G 1/22 248/217.3 |
| D434,303 S | 11/2000 | DeCosta | |
| D436,841 S | 1/2001 | Carpenter | |
| 6,279,862 B1 | 8/2001 | Gershowitz | |
| 6,325,345 B1 | 12/2001 | Carpenter | |
| 6,371,427 B1 | 4/2002 | Johnson | |
| 6,478,273 B1 | 11/2002 | McKiernan, Jr. et al. | |
| 6,641,107 B1 | 11/2003 | Janssen | |
| 6,641,344 B2 | 11/2003 | Weiss | |
| D486,057 S | 2/2004 | Chen | |
| D494,452 S | 8/2004 | Sheldon et al. | |
| 6,775,935 B1 | 8/2004 | Cohen et al. | |
| 6,830,228 B2 | 12/2004 | Ernst | |
| D511,088 S | 11/2005 | Chiu | |
| D515,911 S | 2/2006 | McDuff | |
| D516,412 S | 3/2006 | McDuff | |
| D554,483 S * | 11/2007 | Hager | D8/367 |
| 7,395,998 B2 | 7/2008 | Peterson | |
| 7,431,258 B2 | 10/2008 | Lamotta | |
| 7,497,028 B2 | 3/2009 | Nevers et al. | |
| D596,930 S | 7/2009 | Gaudron | |
| 7,694,401 B2 | 4/2010 | Peterson | |
| 7,708,252 B2 | 5/2010 | Vander Berg et al. | |
| D635,843 S | 4/2011 | McDuff et al. | |
| D636,256 S | 4/2011 | McDuff et al. | |
| D649,022 S | 11/2011 | McDuff et al. | |
| D649,023 S | 11/2011 | McDuff et al. | |
| D649,436 S | 11/2011 | McDuff et al. | |
| D649,437 S | 11/2011 | McDuff et al. | |
| D649,438 S | 11/2011 | McDuff et al. | |
| D649,439 S | 11/2011 | McDuff et al. | |
| D650,261 S | 12/2011 | McDuff et al. | |
| 8,114,226 B2 | 2/2012 | Ernst et al. | |
| 8,272,610 B2 | 9/2012 | Ernst et al. | |
| 8,308,116 B2 | 11/2012 | Daniels | |
| 8,317,148 B2 | 11/2012 | Ernst et al. | |
| D672,224 S | 12/2012 | Brinson et al. | |
| 8,333,356 B2 | 12/2012 | Ernst et al. | |
| 8,398,048 B2 | 3/2013 | Popkin et al. | |
| 8,414,239 B2 | 4/2013 | McDuff | |
| 8,448,910 B2 | 5/2013 | Ernst et al. | |
| 8,740,171 B2 | 6/2014 | Crescenzo | |
| 8,757,570 B2 | 6/2014 | Ernst et al. | |
| 8,857,780 B1 | 10/2014 | Goss | |
| 8,974,166 B2 | 3/2015 | McDuff | |
| 9,044,110 B2 | 6/2015 | McDuff et al. | |
| 9,261,229 B2 * | 2/2016 | Callif | F16M 13/02 |
| 2002/0088912 A1 | 7/2002 | Yu | |
| 2003/0071182 A1 * | 4/2003 | Beaty | A47G 1/20 248/302 |
| 2003/0161680 A1 | 8/2003 | Suckow | |
| 2003/0178545 A1 * | 9/2003 | Ernst | A47G 1/20 248/475.1 |
| 2006/0182517 A1 * | 8/2006 | McDuff | F16B 15/00 411/485 |
| 2007/0124910 A1 | 6/2007 | Peterson et al. | |
| 2007/0205344 A1 | 9/2007 | Liermann et al. | |
| 2007/0235622 A1 | 10/2007 | Baran et al. | |
| 2008/0251682 A1 | 10/2008 | Repac | |
| 2008/0283205 A1 | 11/2008 | Zimmer | |
| 2008/0296456 A1 | 12/2008 | Lien | |
| 2008/0302936 A1 | 12/2008 | Forbes et al. | |
| 2010/0084530 A1 | 4/2010 | Lai | |
| 2010/0213333 A1 | 8/2010 | Mejia et al. | |
| 2010/0219312 A1 | 9/2010 | Johnson et al. | |
| 2012/0001039 A1 | 1/2012 | McDuff et al. | |
| 2012/0001040 A1 | 1/2012 | McDuff et al. | |
| 2012/0056051 A1 | 3/2012 | Gold | |
| 2014/0231604 A1 * | 8/2014 | Long | A47G 1/20 248/217.3 |
| 2014/0346310 A1 | 11/2014 | Yang | |
| 2015/0060627 A1 | 3/2015 | Stauber | |
| 2015/0308613 A1 | 10/2015 | Callif et al. | |

FOREIGN PATENT DOCUMENTS

| | | |
|---|---|---|
| WO | WO 2007/095351 A2 | 8/2007 |
| WO | WO 2015/150222 | 10/2015 |

* cited by examiner

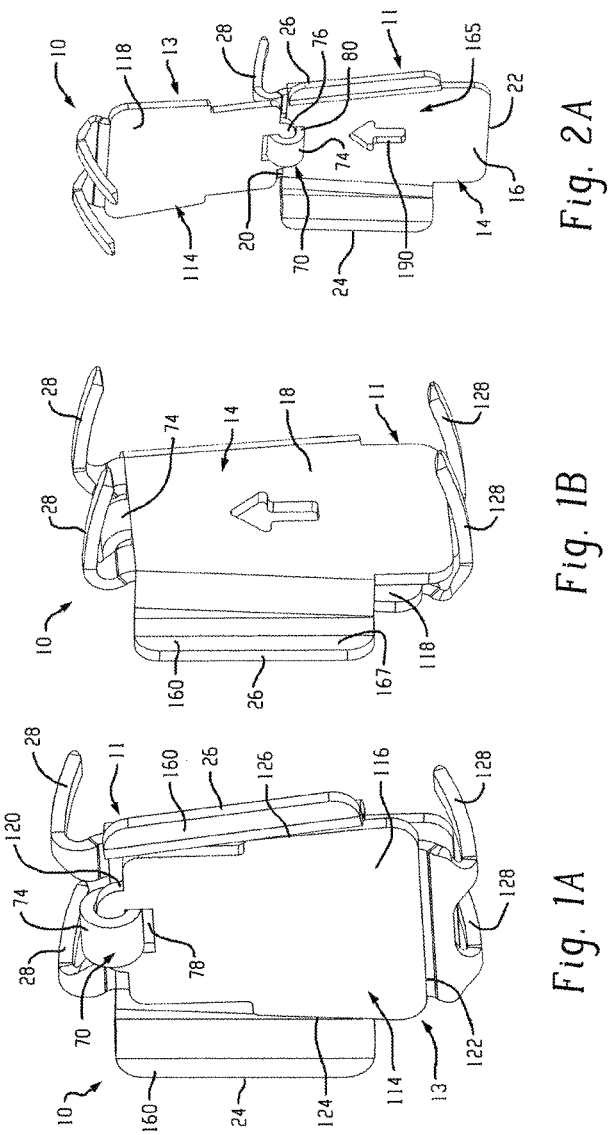

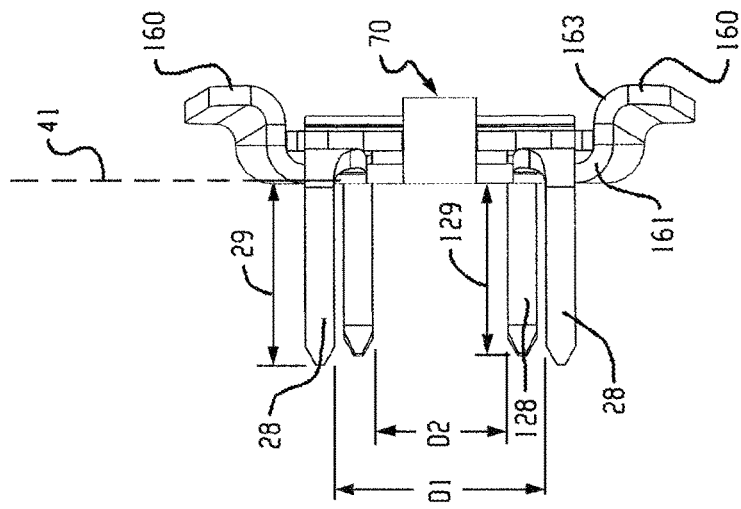
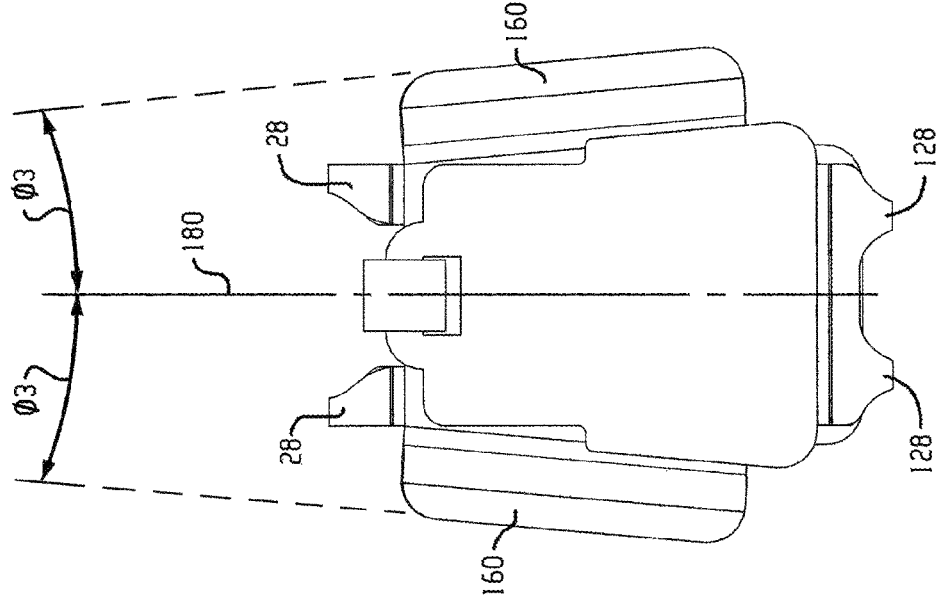
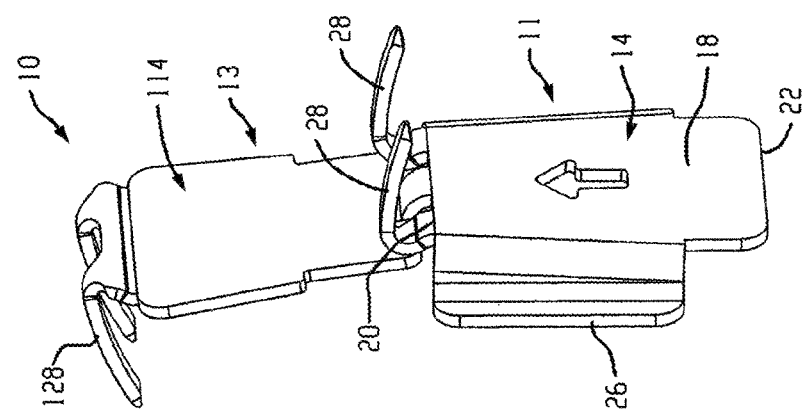
Fig. 3B
Fig. 3A
Fig. 2B

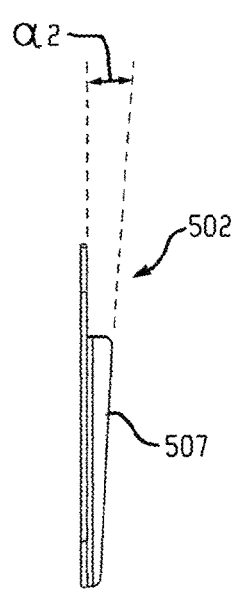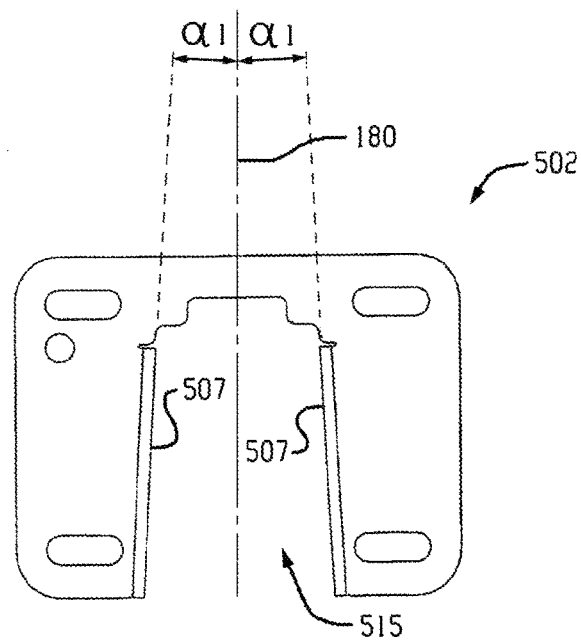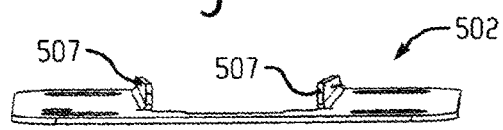
Fig. 17C
Fig. 17A
Fig. 17B
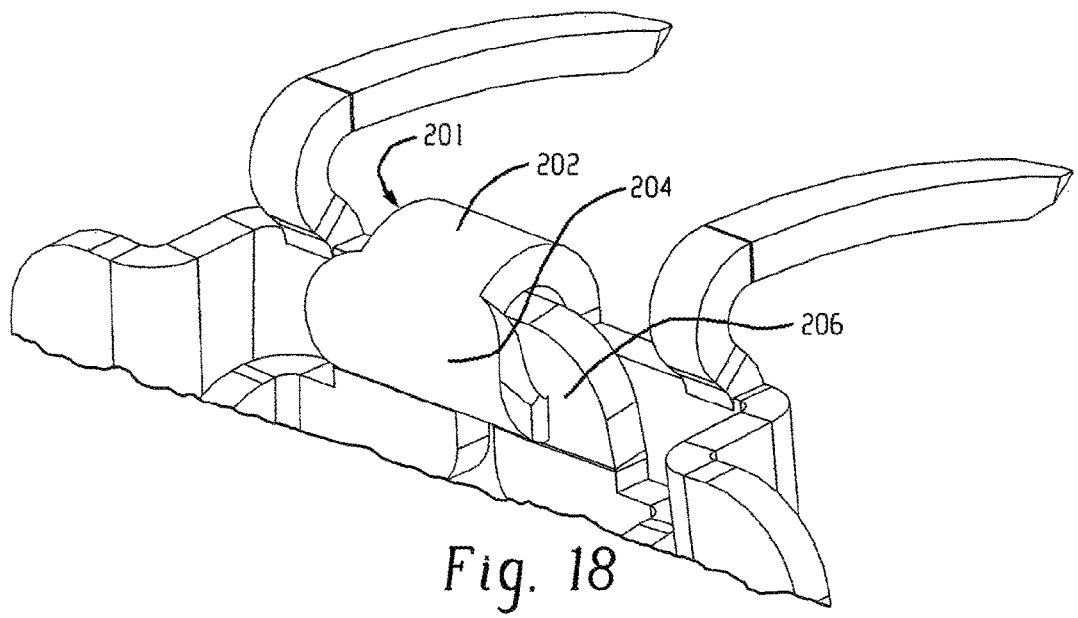
Fig. 18

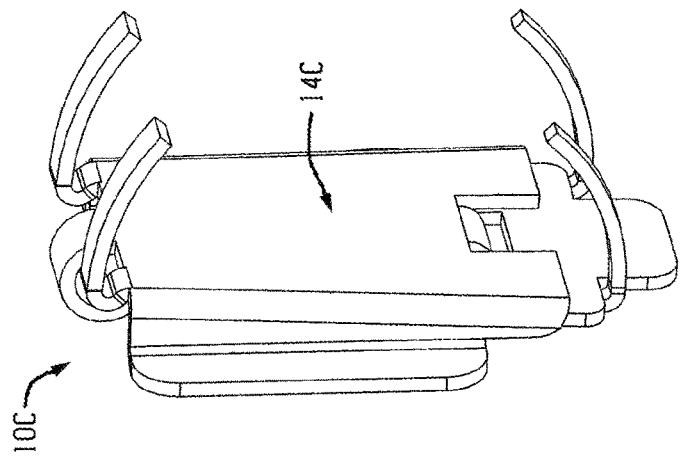
*Fig. 25*
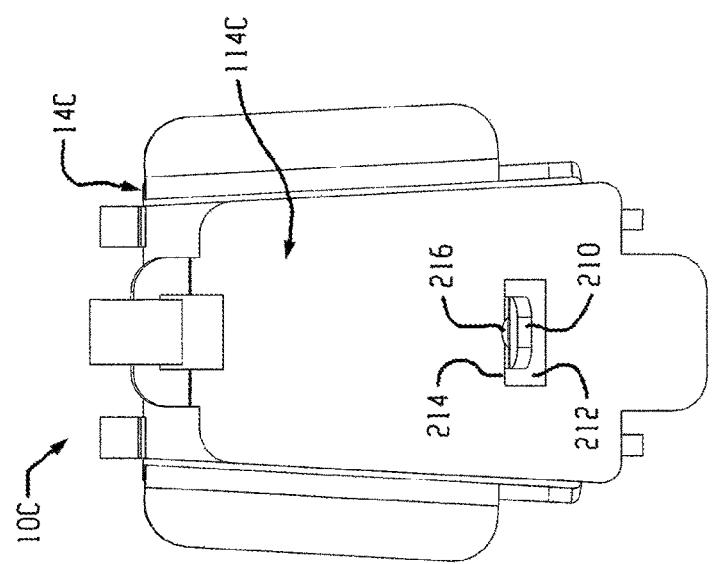
*Fig. 24*
*Fig. 23*

WALL ANCHOR ASSEMBLIES AND RELATED WALL MOUNT SYSTEMS

TECHNICAL FIELD

This application relates generally to wall anchors and related systems, methods and components.

BACKGROUND

Numerous products exist for installing a hook or hanging device onto a wall, such as for hanging a picture frame, a mirror, or the like. Conventional nails and screws are not always convenient solutions and may not provide sufficient support strength in the wall, particularly in the case of drywall, or other friable wallboards, which are relatively weak.

Anchors incorporating curved saber tooth shaped retainers are known from U.S. Pat. Nos. 8,974,166 and 8,414,239. However, such anchors are still difficult for the typical homeowner to install and use properly because a hammer is generally needed to complete the anchor installation. These anchors also generally have a large wall penetration that tends to crumble and weaken the surrounding wall media adjacent the penetration and leave a large hole that is not easily repaired. It is also impractical to reposition these types of anchors after initial insertion in locations proximate the original hole for the purpose of making minor position adjustments. Moreover traditional anchors with simple hooks are not suited to mount a wide variety of objects in a secure manner.

It would be desirable to provide an anchor device and related installation method that facilitates ease of installation, but at the same time results in an anchor with a high support strength and less damage to the wallboard, leaving relatively small holes upon anchor removal and therefore also permitting minor position adjustments if needed. To provide these advantages in connection with an anchor that installs without reference to stud or other supporting structure location and/or without concern for wires or pipes behind the wall, would also be beneficial. In addition, providing an anchor assembly that provides a mounting system with enhanced resistance to loading perpendicular to the wall surface in order to secure numerous types of secondary components such as a shelf, towelbar, coat rack or similar devices, all of which generate cantilever loading on the anchor, would be desirable.

SUMMARY

In one aspect, an anchor assembly for hanging an object on a wall includes a first anchor component and a second anchor component. The first anchor component includes a first base having front and back sides, at least one wall penetrating retainer extends from the first base and includes a wall penetrating extent that protrudes rearwardly of the first base and has a curved configuration. The second anchor component includes a second base having front and back sides. The second anchor component is pivotably associated with the first anchor component for movement between an anchoring orientation and a non-anchoring orientation to enable staged installation of the anchor assembly into a wall. At least one wall penetrating retainer extends from the second base and includes a wall penetrating extent that protrudes rearwardly of the second base and has a curved configuration. When the second anchor component is in the anchoring orientation the curved configuration of the wall penetrating extent of the second anchor component opposes the curved configuration of the wall penetrating extent of the first anchor component to form a jaw-type arrangement.

In another aspect, an anchor assembly for hanging an object on a wall includes a first anchor component and a second anchor component. The first anchor component includes a first base having front, back, top, bottom, left and right sides, at least one wall penetrating retainer extends from the first base and includes a wall penetrating extent that protrudes rearwardly of the first base and has a curved configuration. The second anchor component includes a second base having front, back, top, bottom, left and right sides, the second anchor component pivotably associated with the first anchor component for movement between an anchoring orientation and a non-anchoring orientation. In the anchoring orientation the second anchor component is positioned at least partly in front of the first anchor component. The second anchor component includes at least one wall penetrating retainer extending from the second base and includes a wall penetrating extent that protrudes rearwardly of the second base and has a curved configuration. When the second anchor component is in the anchoring orientation the curved configuration of the wall penetrating extent of the second anchor component opposes the curved configuration of the wall penetrating extent of the first anchor component to form a jaw-type arrangement.

In another aspect, a member adapted for installation on a wall mounted anchor assembly includes a wall facing side including a mount bracket defining a mount channel with an open bottom side. The mount channel includes (i) a pair of laterally spaced apart surfaces that angle rearwardly when moving vertically downward and/or (ii) a pair of laterally spaced surfaces that angle toward each other when moving vertically upward.

In another aspect, a template system for positioning multiple anchor assemblies on a wall includes an elongated template unit including at least two spaced apart openings, each opening having at least one edge portion configured for engaging a portion of an anchor assembly to define an install position for the anchor assembly.

In another aspect, a method of mounting first and second members on a wall involves: utilizing first and second template units, the first template unit having a profile shape substantially the same as a profile shape of the first member, the first template unit having at least one opening that defines at least a first wall anchor install location, the first template unit includes a wall side with one or more adhesive regions to enable the first template unit to be releasable mounted on the wall, the second template unit having a profile shape substantially the same as a profile shape of the second member, the second template unit having at least one opening that defines at least a first wall anchor install location, the second template unit includes a wall side with one or more adhesive regions to enable the second template unit to be releasable mounted on the wall; adhesively mounting the first template unit on the wall at a first potential location for mount of the first member; adhesively mounting the second template unit on the wall at a second potential location for mount of the second member; viewing a relative location and orientation of each of the first template unit and the second template unit at a distance from the wall to evaluate whether the relative location and orientation is desired.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1A-1B show front and rear perspectives of an anchor assembly;

FIGS. 2A-2B show front and rear perspectives of the anchor assembly in a non-anchoring orientation;

FIGS. 3A and 3B show front elevation and top plan views of the anchor assembly of FIG. 1A;

FIGS. 17A-17C show one embodiment of a bracket mountable to the shelf member;

FIG. 18 shows a perspective view a hinge connection variation;

FIGS. 23-25 show another embodiment of an anchor assembly;

DETAILED DESCRIPTION

Figure 4C:
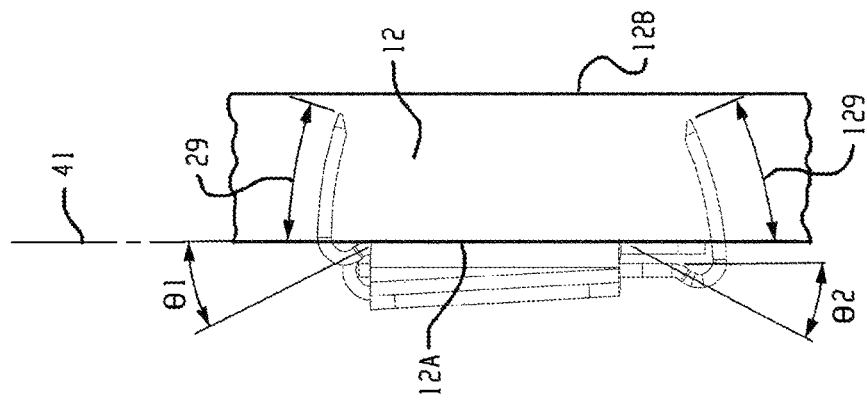
FIGS. 4A-4C show an install sequence of the anchor assembly of FIG. 1A.

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-4, an anchor assembly 10 is shown. The anchor assembly 10 includes a pair of anchor components 11 and 13 pivotably engaged with each other so that anchor component 13 can move between an anchoring orientation (e.g., FIGS. 1A, 1B and 4C) and a non-anchoring orientation (e.g., FIGS. 2A, 2B and 4A) relative to anchor component 11. Anchor component 11 includes a base 14 having front 16, back 18, top 20, bottom 22, left 24 and right 26 sides. In the illustrated configuration the base 14 is formed by a base plate (e.g., metal plate), the front side 16 and back side 18 are formed by the substantially planar front and rear surfaces of the base plate, and the top side 20, bottom side 22, left side 24 and right side 26 are formed by respective edges of the base plate. However, it is recognized that different configurations for the base 14 are possible as will be evident from other embodiments described below. One or more wall penetrating retainers 28 (in the illustrated case a pair of spaced apart retainers) extend from the base 14, each retainer having a corresponding wall penetrating extent 29 with a primarily downwardly curved configuration as will be described in greater detail below.

Anchor component 13 includes a base 114 with front 116, back 118, top 120, bottom 122, left 124 and right 126 sides. As used herein the references front, back, top, bottom, left and right sides in relation to the anchor component 13 refer to portions of the anchor component 13 when in its anchoring orientation. In the illustrated embodiment base 114 is also formed by a base plate, which may be referred to as the outer plate in the context of the overall anchor assembly. Anchor component 13 is pivotably connected to the anchor component 11 (e.g., by way of a hinge connection 70 toward the top of the base plate and the top of the outer plate). The plates may, by way of example, be metal plates such as spring steel, but variations are possible. Likewise, bases that are not of plate construction are contemplated. The hinge connection 70 enables the anchor component 13 to move between the anchoring orientation (e.g., FIGS. 1A and 1B) relative to the anchor component 11 and a non-anchoring orientation (e.g., FIGS. 2A and 2B) relative to the anchor component 11.

The illustrated embodiment of FIGS. 1-4 shows the hinge connection 70 between the outer plate and the base plate as a closed hinge connection (i.e., one in which the hinge is configured to prevent the two pieces from being readily separated). The hinge connection 70 is formed by a hinge loop 74 formed by looped material of the base plate 14, where the hinge loop 74 captures a hinge pin 76 formed by a strip of the base plate 114 that bounds one side of an opening 78 in the base plate 114. Notably, the bottom portion 80 of the hinge loop 74 is formed as a flat (with little or no curve), which facilitates formation by progressive stamping. Of course, alternative embodiments for hinge connections are possible. For example, referring to FIGS. 5A-5c, an anchor assembly 10A is shown in which a base plate 14A and an outer plate 114A with an open hinge connection 70A achieved by an downwardly turned lip 150 at the top of the base plate to form a seating groove 152 into which the top edge of the outer plate 114A may be positioned as shown. The groove 152 provides a stable pivot surface to facilitate pivot of the outer plate 114A relative to the base plate 14A during anchor installation (as will be described in more detail below relative the embodiment of FIGS. 1-4), while at the same time enabling the outer plate 114A to be removed from the base plate 14A by pulling the outer plate 114A downward and out of the groove 152. In this open hinge configuration, the orientation shown in FIG. 5A represents the anchoring orientation of the anchor assembly 10A.

Referring again to FIGS. 1-4, in the anchoring orientation, the back side 118 of the outer plate 114 is positioned alongside and forward of the front side 16 of the base plate 14 to cover a significant portion of the base plate 14, and one or more wallboard penetrating retainers 128 that extend from the base plate 114 each have a wall penetrating extent 129 the protrudes rearwardly of the base plate 114 and has an upwardly curved configuration that opposes the downwardly curved configuration of retainers 28 in a bite-like formation. In the non-anchoring orientation the anchor component 13 is pivoted above and/or forward of the base plate 14.

In this regard, in some embodiments the hinge connection between the two components may include a useful install feature. Specifically, as best seen in FIG. 18 the hinge cylinder 201 may include an upper portion 202 and a lower portion 204, where upper portion 202 is more narrow than lower portion 204. The hinge ring 206 is sized to easily move along the upper portion 202 without any interference, but has some interference with the edges of the lower portion 204 so that when the forward anchor component is raised into the non-anchoring position, the forward anchor component will remain in the raised position of its own accord (e.g., the force of gravity alone will not be enough to cause the forward anchor component to rotate downward). This is an advantageous feature because the forward anchor component is thereby held out of the way of the user during the first stage of anchor install. It is recognized that other types of structures (e.g., detents, varying thicknesses etc.) could be incorporated to enable such a feature.

Referring again to anchor assembly 10, although the number of wallboard penetrating retainers can vary, in the illustrated embodiment two wallboard penetrating retainers 28 extend from the base plate 14, and two wallboard penetrating retainers 128 extend from the outer plate 114. Notably, the two wallboard penetrating retainers 28 are laterally spaced apart by a distance D1 and the two wallboard penetrating retainers 128 are laterally spaced apart by a distance D2, where D2 is smaller than D1. Thus, as viewed from the top plan view of FIG. 3B, the wallboard penetrating retainers 128 are positioned laterally between (though vertically offset from) the wallboard penetrating retainers 28 when the anchor component 13 is in the anchoring orientation. In an alternative variation the distance D2 between retainers 128 could be larger than the distance D1 between retainers 28, so that, as viewed from the top plan view, the wallboard penetrating retainers 28 would be positioned laterally between (though vertically offset from) the wallboard penetrating retainers 128 when the anchor component 13 is in the anchoring orientation.

As shown, the back side 118 of the outer plate 114 may at least in part abut and/or seat against the front side 16 or other part of the base plate 14 when the anchor component 13 is in the anchoring orientation. This arrangement provides for stability of the overall anchor assembly and enables a user to readily recognize when the anchor assembly is fully installed. Such contact may be achieved be engaged planar surfaces, or one or more discrete contact points of contact between the back of the outer plate and the base plate, and in some cases very small contact points or area could be provided between the two. In other arrangements some contact points between the outer plate 114 and the wall surface 12A could be provided for stability.

In the illustrated embodiment, the wallboard penetrating retainers 128 of the outer plate 114 pass below the bottom side or edge of the base plate 14 when the anchor component 13 is in the anchoring orientation. However, it is recognized that other variations are possible, such as the inclusion of one or more openings in the base plate 14 through which the retainers 128 extend when the anchor component 13 is moved to the anchoring orientation, or such as the retainers 128 passing around the left and right sides of the base plate 14 (as suggested by the anchor 10E shown in FIGS. 30-35).

The basic two anchor component arrangement provides for an advantageous and user friendly method for installation. In particular, referring to FIGS. 4A-4C, a method of installing the anchor assembly 10 includes placing the bottom side 20 of the base plate 14 adjacent a front surface 12A of the wallboard 12 with a distal end of the wallboard penetrating retainers 28 in contact with the front surface 12A and with the outer plate 114 in a non-anchoring orientation as shown in FIG. 4A. Pressure P is applied to the base plate 14 (preferably by the user's thumbs, but alternately a tool could be used) to rotate the wallboard penetrating extents 29 of the retainers 28 into the wallboard until the back side 16 of the base plate 14 seats against the front surface 12A of the wallboard as shown in FIG. 4B. Next, the anchor component 13 is pivoted downward, per arrow 72, until a distal end of the wallboard penetrating retainers 128 of the outer plate 114 comes into contact with the front surface of the wallboard. Pressure can then be applied to the outer plate 114 to rotate the wallboard penetrating extents 129 of the retainers 128 into the wallboard (in a similar manner to that described above) until the anchor component 13 achieves the anchoring orientation and final install position shown in FIG. 4C. This two stage method of retainer penetration results in an anchor assembly with a suitable number of retainers to hold larger weights without requiring excessive forces to move the retainers into the wall. The final install position results in a jaw-type gripping action of the anchor assembly into the wall, with retainers 28 and 128 curving toward each other. The gripping action supports high hanging loads and loads with a moment component, such as a shelf loads, towel bars, coatracks etc. that can be supported on the anchor assembly.

Notably, as mentioned above, the wallboard penetrating extents 29 of the retainers 28 have a primarily downwardly curved configuration and the wall penetrating extents 129 of the retainers 128 have a primarily upwardly curved configuration when anchor component 13 is in the anchoring orientation. In this regard, the wallboard penetrating extents 29 and 129 are both preferably arcuate. In such implementations, the radius of curvature $R_{28}$ defined of the arcuate extents 29 may have a center point 34 that is proximate the bottom side of the base plate 14. In particular, the center point 34 of the radius of curvature $R_{28}$ may desirably be positioned at a rear, bottom corner of the base plate where the bottom side of the base plate meets the back side of the base plate as shown. This geometry minimizes the energy and force required to insert the retainers 28, minimizes damage to the wall and results in small wall surface perforations when the anchor is removed. For similar reasons, the wallboard penetrating retainers 128 may have a radius of curvature $R_{128}$ with a center point 134 substantially aligned with the pivot axis of the hinge connection 70, though this pivot axis may move slightly due to play in the hinge. This pivot axis runs substantially parallel to a wall mount plane 41 of the base 14, where plane 41 is defined by one or more portions of the back side of the base 14 that will seat against the front wall surface 12A upon install of the anchor assembly.

In one implementation, each radius of curvature $R_{28}$ and $R_{128}$ may be between about 1.20 inches and about 1.45 inches. However, in the anchor assembly 10 the radius of curvature $R_{128}$ will be slightly smaller than the radius of curvature $R_{28}$, resulting in the wall penetrating extents 129 of retainers 128 passing into and within the wall 128 at a slightly more aggressive angle than the extents 29 of retainers 28, as seen in FIG. 4C.

Where the retainers 128 on the outer plate 114 are the same size as the retainers 28 on base plate 14, when the outer plate is in the anchoring orientation, a spacing between the back side or wall mount plane 41 of the base plate 14 and a distal end of the wallboard penetrating retainers 28 will be slightly greater than a spacing between the back side of the base plate 14 and a distal end of the wallboard penetrating retainers 128. However, other variations are possible, such as where retainers 128 are slightly longer than retainers 28 so that the distal ends of both the retainers 28 and 128 end up at substantially the same depth (measured perpendicular to wall surface 12A) in the wall 12, as will described in more detail below.

Figure 4B:
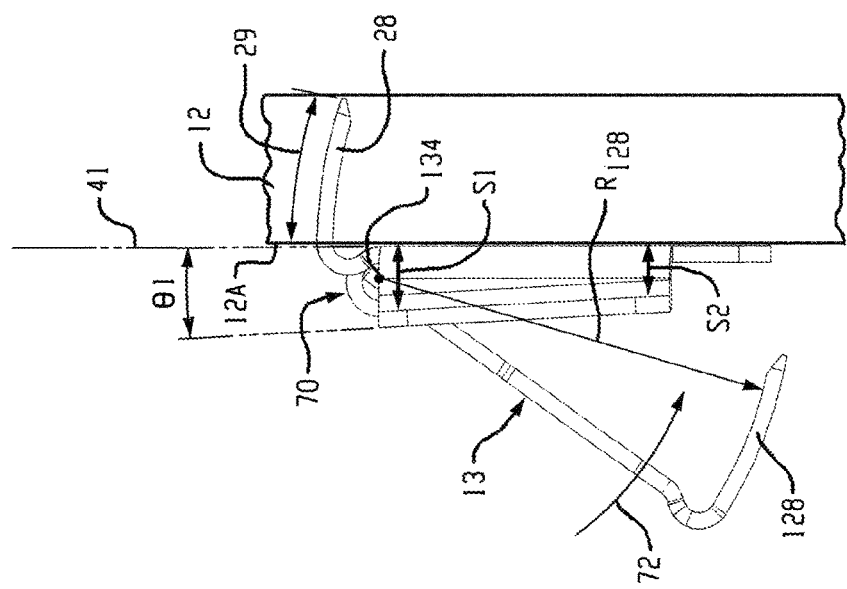
Figure 4A:
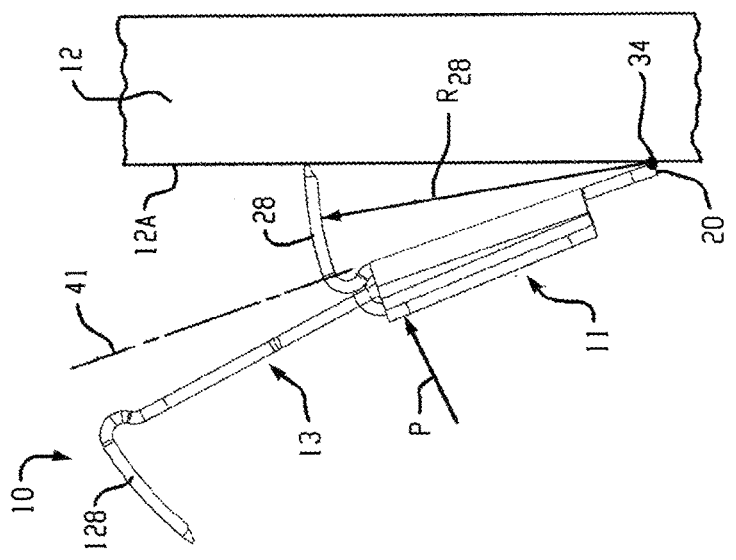
Figure 5A:
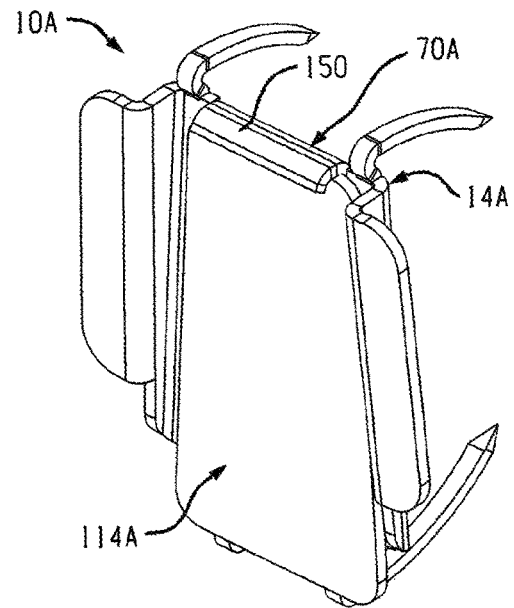
FIGS. 5A-5C show another embodiment of an anchor assembly.
Figure 5B:
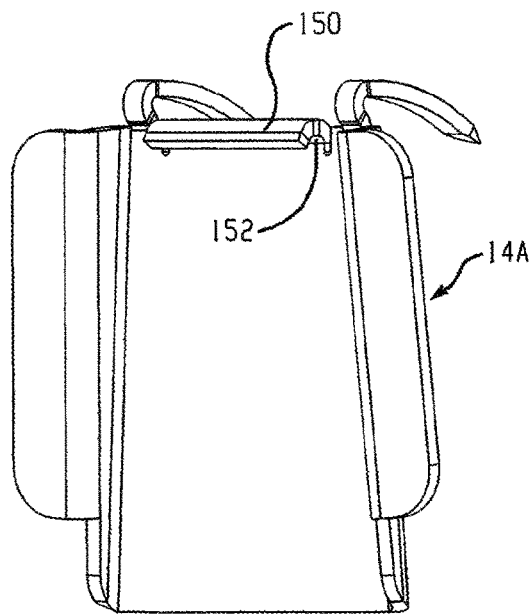
Figure 5C:
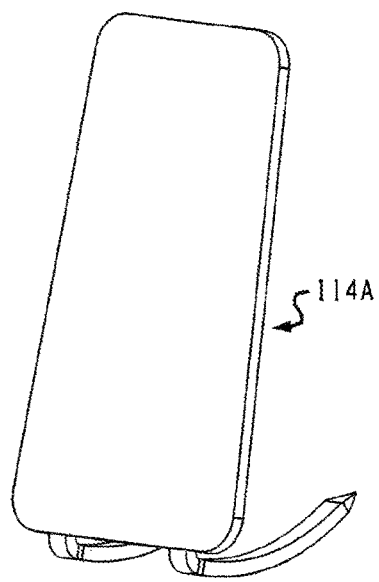

Referring now primarily to FIG. 4C, in the illustrated embodiment, each wall penetrating retainer 28 and 128 departs its respective base with an initial forward progression reflected by angles θ1 and θ2 and then turns back (e.g., with the illustrated relatively sharp curve) to define a rearward and downward progression along the wall penetrating extent 29 and a rearward and upward progression along the extent 129 (e.g., having a primary arcuate shape as described above). By way of example, angle θ1 and θ2 (e.g., taken relative to a plane parallel to the wall mount plane at the back side of the base 14) may be between about 1 degree and about 30 degrees (such as between about 10 degrees and about 20 degrees or between about 15 degrees and about 25 degrees), though variations are possible. The initial forward progression can be achieved by a slight forward bend in the entire top edge of the base 14 or bottom edge of the base 114, or can be achieved by having only the retainers bend forward as they leave the top edge of the base plate. The initial portion of each retainer 28 and 129 may also be flared as it leaves its respective base. This forward progression feature is advantageous because it provides clearance for a generous bend retainer radius at the juncture of the retainer and the base plate to prevent stress cracking at this point of maximum bending load while assuring that when fully inserted the rear side of the base plate can land flush with the wall. In this regard, the initial portion of each wall penetrating retainer 28, 128 that is forward of the back side of the respective base 14, 114 curves forward and then curves rearward as shown, and a radius of curvature at every point along the initial portion may be no less than 100% (e.g., no less than 125%) of the plate thickness. The wall penetrating extent 29, 129 of each retainer extends generally from the wall mount plane 41 to the distal end of the retainer.

Notably, the initial forward progression feature described above also displaces or offsets the retainers 28 from the base 14 and the retainers 128 from the base 114. In fact, in the illustrated embodiment although the wall penetrating extents 29 and 129 are located rearward of the base 14 (when anchor component 13 is in the anchoring orientation), the extents 29 and 129 are not located directly behind the base 14, which aids in pull-out retention.

In order to facilitate anchor installation, the wall penetrating retainers 28 and 128 can also be configured with other advantageous features.

For example, to facilitate manual wallboard penetration and passage without tools, utilizing thumb force only (e.g., applied at the thumb capture zones), the wallboard penetrating retainers 28 and 128 may be formed with a relatively smooth external surface finish (e.g., achieved by polishing, painting or plating). In this regard, the surface of the wallboard penetrating retainers 28 and 128 can be manufactured with or modified to a maximum average surface roughness of about 20 μinch (e.g., in some cases n a maximum average surface roughness of about 15 μinch). In one implementation, just the wallboard penetrating extent of each of the wallboard penetrating retainers is worked, pro- cessed or otherwise formed to achieve this desired low surface roughness feature in order to reduce manufacturing cost. The latter implementation would reduce install force but maintain friction on the rougher portions of the penetrating retainer to resist removal forces. The retainers may have a polished surface finish and/or a plated surface finish and/or a painted finish and/or a lubricant (e.g., Teflon) incorporated into the surface finish.

Figure 6:
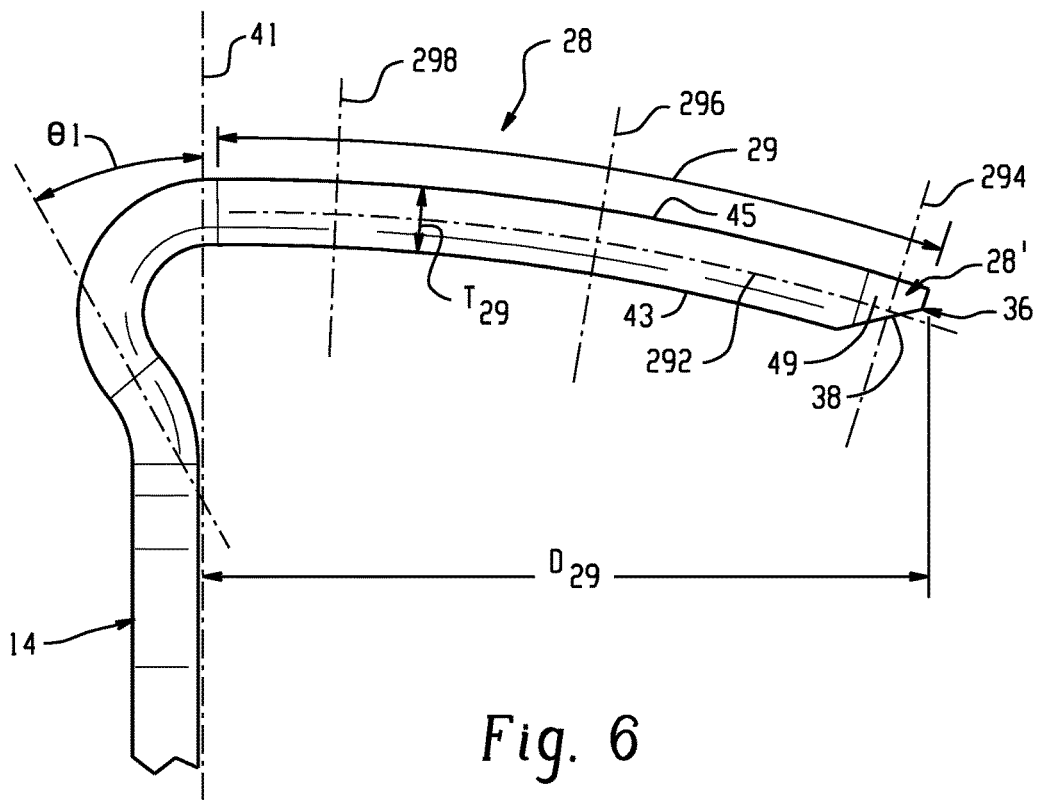
FIG. 6 shows a side elevation of a retainer of the anchor assembly of FIG. 1A.
Figure 7:
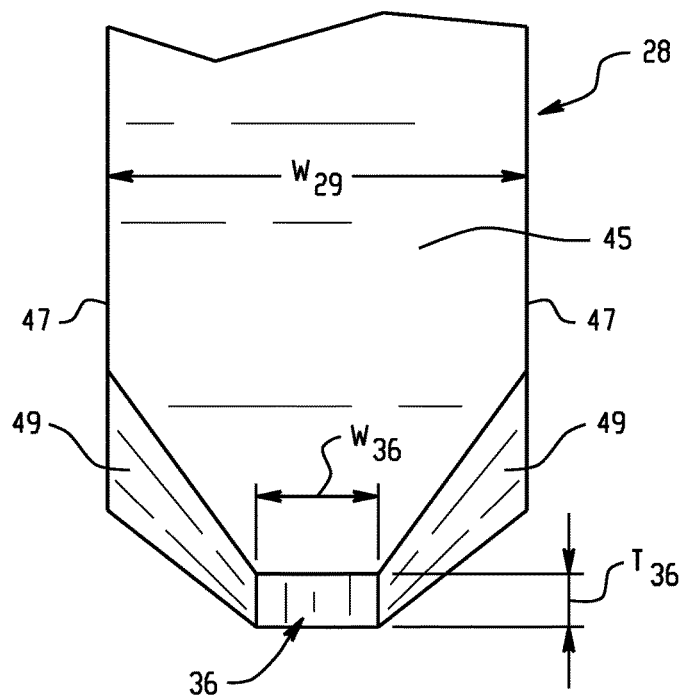
FIG. 7 shows an end elevation of the retainer of FIG. 6.
Figure 10:
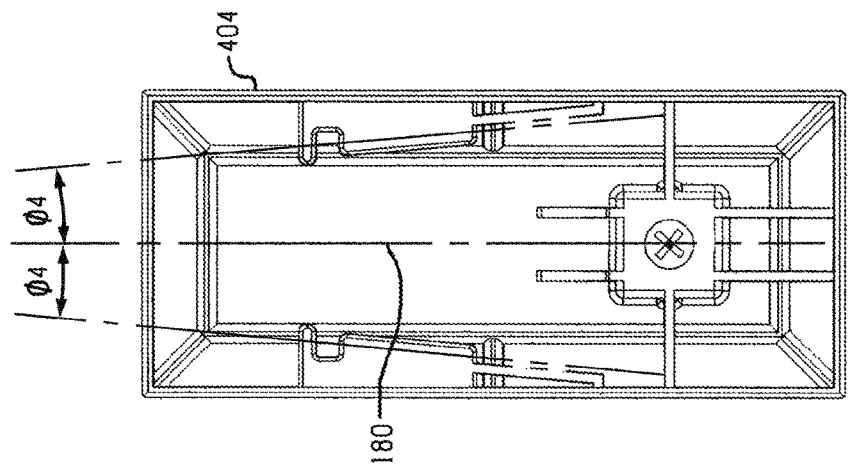
FIGS. 8-14 show on embodiment of a hook member mountable on the anchor assembly of FIG. 1A.
Figure 9:
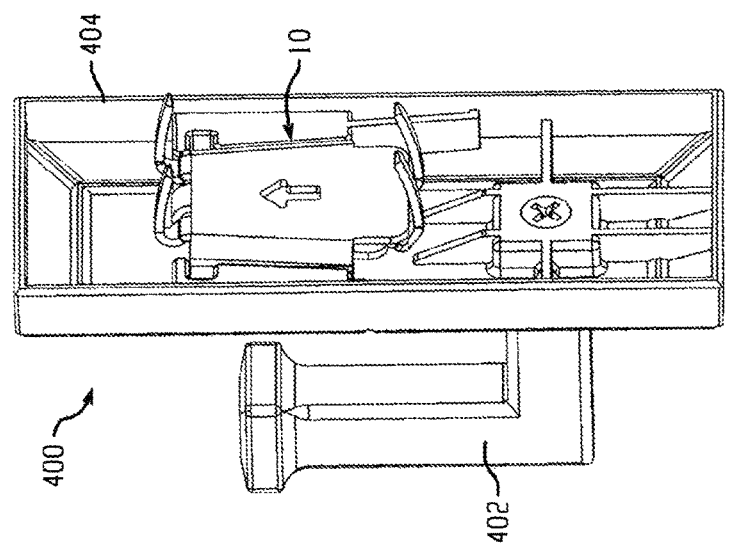
Figure 8:
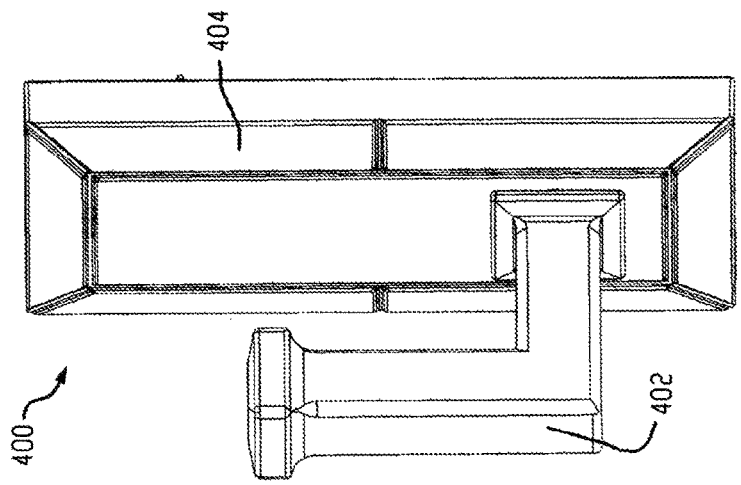
Figure 11:
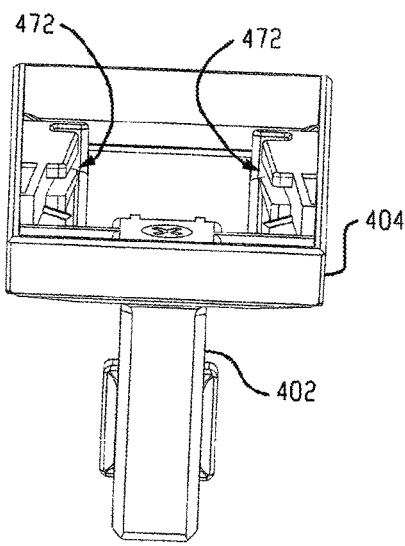

The distal ends of the retainers 28 and 128 may also be configured to facilitate installation. In this regard, and referring to FIGS. 6 and 7, the distal end 28' of each wallboard penetrating retainer 28 includes a pointed tip that is shaped to provide a point 36 when viewed in cross-section taken along a vertical plane running along a length of the wallboard penetrating retainer, where the point 36 is defined by a bevel 38 at a bottom side of the distal end of the wallboard penetrating retainer. In particular, in the illustrated side elevation it is seen that the wall penetrating extent 29 includes a concave curved surface 43 separated form a convex curved surface 45, and lateral an opposed side surfaces 47 that are substantially planar and that extend between the convex curved surface and the concave curved surface. The bevel 36 extends from the concave surface 43 toward the point 36 and little or no bevel extends from the convex surface 45 toward the point 36, to thereby place the point 36 closer to the convex surface of the wall penetrating extent. This type of beveled point is advantageous because the applicants have discovered that including a bevel at the top side of the wallboard penetrating retainer disadvantageously creates a reaction force with the wallboard material that tends to cause the bottom side of the base plate to be pivoted out away from the front surface of the wallboard. Side bevels 49 may also be optionally incorporated to achieve the point 36 as shown. In one implementation, a lateral width $W_{36}$ of the point is no more than 35% of a lateral width $W_{29}$ of a major portion of the wall penetrating extent, and a thickness $T_{36}$ of the point is no more than about 40% of a thickness $T_{29}$ of the major portion of the wall penetrating extent. The above-described configuration may also be applied to the retainers 128.

Figure 4D:
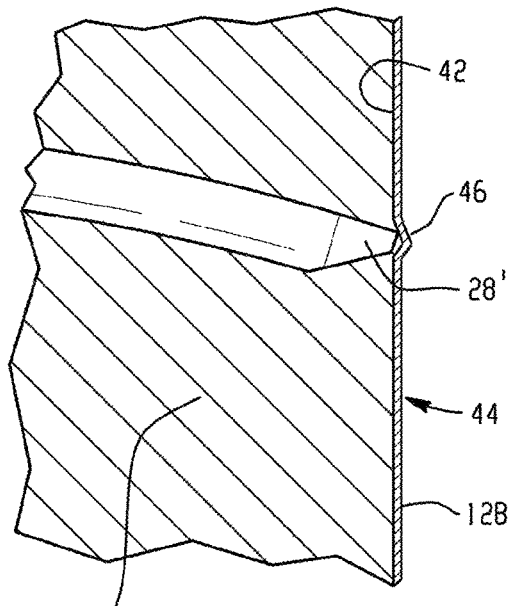
FIG. 4D shows one arrangement of a retainer distal end after install.

Proper sizing of the wallboard penetrating retainer(s) can also be used to achieve more user friendly performance of an anchor. In particular, and referring again to FIG. 4C, it is seen that in some implementations when the anchor assembly 10 is installed at the front surface of a wall, the distal ends of the wallboard penetrating retainers 28 and 128 may be positioned proximate to a wallboard rear surface 12B without passing through the rear surface. Referring to FIG. 4D, in some arrangements of this type, the distal end 28' of the wallboard penetrating retainer actually contacts an internal side 42 of the paper layer 44 that defines the rear surface of the wallboard but, again, does not pass through the paper layer 44. The distal end of the wallboard penetrating retainer may even cause a localized rearward protrusion 46 in the paper layer 44 at a point of contact with the paper layer but, again, without passing through the paper layer 44. Arrangements of this type, in which the wallboard penetrating retainer is in contact with or proximate the paper layer 44 defining the rear surface 12B without passing through that paper layer are advantageous in that applicants have discovered that it can take five pounds or more of additional force to install an anchor if the distal ends of the retainers must pass through rear paper layer 44 in order to achieve final anchor seating position. For the general consumer/home/residential application, the majority of drywall is ½ inch thick, and therefore the retainers can be sized with this in mind. In such cases, a perpendicular distance D29 of the wall penetrating extent 29 between the wall mount plane 41 and the point at the distal end of the wall penetrating retainer can be no more than 0.50 inches (e.g., between about 0.44 inches and about 0.50 inches for assuring that when the anchor is installed on a wallboard that is ½ inch thick the wall penetrating retainer will approach but not pass through a back side of the wallboard). Of course, in some embodiments the retainers could be longer and pierce the back paper layer of the wallboard. Again, the above-described configuration may also be applicable to the retainers 128 when the anchor assembly 10 is installed with anchor component 13 in its anchoring orientation.

Generally, by properly selecting the cross-sectional size and number of wall penetrating retainers used on each anchor component and/or by incorporating one or more of the above wall penetrating retainer features, each anchor component can be manually inserted into type X gypsum wallboard (with physical characteristics per the ASTM C1396—Standard Specification For Gypsum Board) by positioning the bottom (or distal) side adjacent the wallboard and rotating the anchor upward to move the wallboard penetrating member into the wallboard with a force P (FIG. 4A) of no more than 15 pounds per retainer normal to the base plate at the retainer location when the distal ends of the retainers do not penetrate the rear side of the wallboard per design. Measurement of the level of insertion force required can be achieve utilizing a force gage mounted to a rotating fixture so that the measured pressure or force "P" is always proximate to the penetrating retainer(s) and normal to the base plate at the retainer location, with a rotational installation time of about 2.0 seconds where the starting point of rotation is with the distal end(s) of the retainer(s) against the wallboard and the ending point of rotation corresponds to final seating of the anchor. In anchor embodiments having a single retainer (contemplated below), the installation force to final seating of the anchor should typically be 15 pounds total or less. In anchor embodiments having two retainers, the total installation force to final seating of the anchor should typically be 30 pounds total or less. In either case, the required total level of force can advantageously be achieved without the use of tools.

In one example, such low insertion forces for the retainer(s) of a given anchor may be achieved where the retainers have pointed distal ends as described above and a generally uniform cross-section along the remainder of the wall penetrating extent of the retainer, where an area of the cross-section is no more than about 2.5 mm$^2$. In one example, in the case retainers of rectangular cross-section as suggested in anchor 10, the main segment of the wall penetrating extent of each retainer may be on the order of 0.042 inches by 0.068 inches (e.g., 0.042 inches thick and 0.068 inches wide), resulting in a cross-sectional area of about 0.00286 in$^2$ (about 1.845 mm$^2$). In another example, the main segment of the wall penetrating extent may have a rectangular cross-section on the order of 0.050 inches by 0.075 inches (e.g., 0.050 inches thick and 0.075 inches wide), resulting in a cross-sectional area of about 0.00375 in$^2$ (about 2.419 mm$^2$). Regardless of whether one or multiple retainers are used, it may be advantageous (e.g., for the purpose of ease of install and/or for the purpose of limiting wall damage) to assure that the total retainer cross-sectional area (e.g., the cross-sectional area of one retainer if only one is used or the total cross-sectional area of two retainers if two retainers are used) is no more than about 5 mm$^2$ (about 0.008 square inches, or in some cases no more than about 6 mm$^2$), where the cross-section of each wall penetrating extent of the retainer is taken perpendicularly to a lengthwise axis 292 (FIG. 6) of the retainer (which axis is curved like the retainer) and is taken at any location along a length of the wall penetrating extent 29 that will embed within a wall (e.g., a cross-section in any of planes 294, 296 or 298). This arrangement facilitates installation and reduced wall hole size that must be repaired after anchor removal.

Referring primarily to FIGS. 1A, 3A, 3B and 4B, the base plate 14 includes side flanges 160 that are offset from the wall mount plane 41 (e.g., which position may be achieved by suitable bends in the base plate, such as primarily a forward bend 161 and a primarily lateral bend 163). The side flanges 160 are angled slightly rearward when moving in a vertically downward direction (represented by acute non-zero angle Φ1) such that a spacing S1 of the upper end of the flanges 160 to the wall mount plane 41 of the base 14 is greater than a spacing S2 of the lower end of the flanges 160 to the wall mount plane (where the spacings run perpendicular from the wall mount plane 41). The flanges 160 may be used to mount a separate member or component, such as a hook, floating shelf or other structure onto the anchor assembly 10.

Notably, the offset nature of the flanges 160 by way of the aforementioned forward bend may also create a vertical channel 165 (FIG. 2A) in base 14, and into which the base 114 moves to attain the anchoring orientation. Moreover, the base 14 includes a visible indicator 190 in the form of an arrow to aid the user during installation by designating the proper upright orientation of the base 14. In the illustrated embodiment the indicator 190 is in the form of a cut-out or opening in the plate material, but other forms of such visible indicators could be provided.

Figure 12:
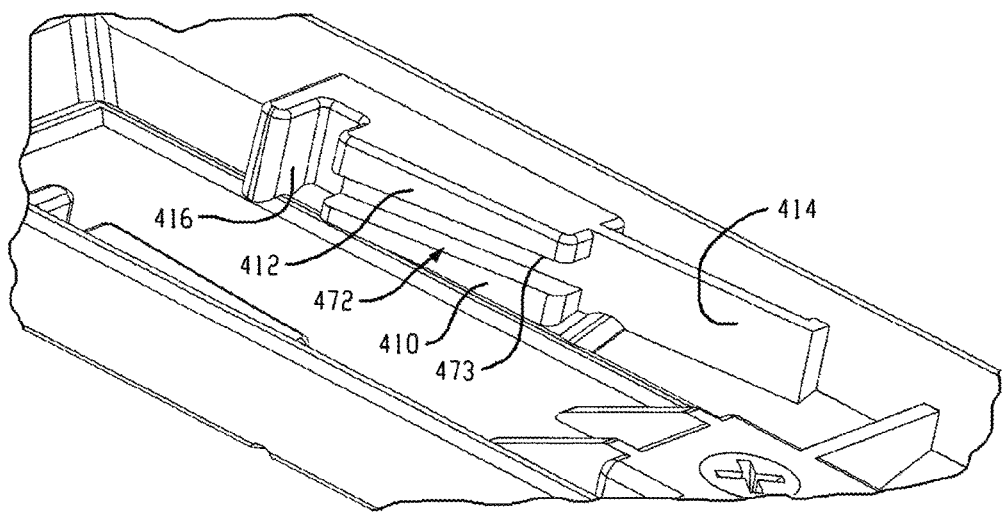
Figure 14:
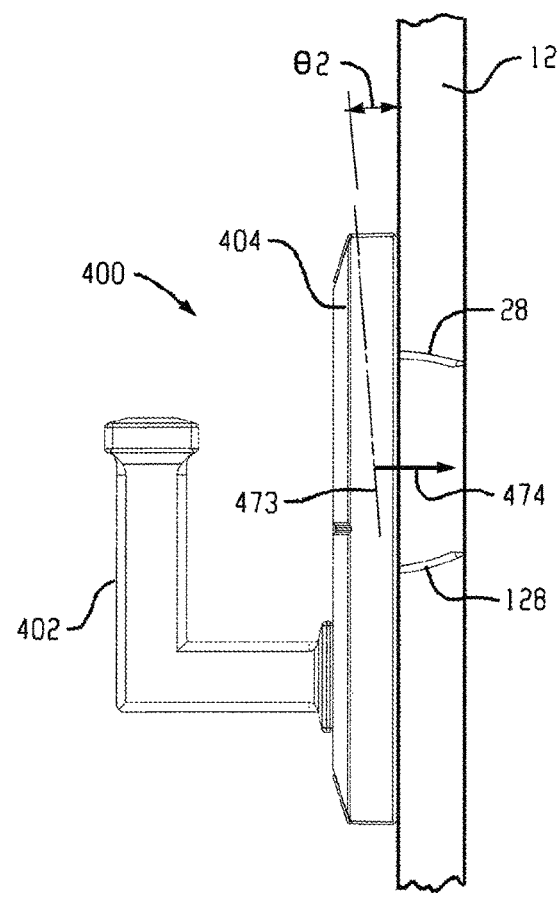

Referring to FIGS. 8-14, a hook unit 400 is shown and includes a hook 402 protruding forwardly from a mount base 404. The rear side of the mount base 402 is configured to slidingly engage with the anchor assembly 10 after the anchor assembly 10 has been installed on a wall so that the anchor assembly 10 supports the hook unit 400 on the wall. In particular, the rear side of the mount base 404 includes laterally spaced apart channels 472 that are configured to align with and slide over the side flanges 160 of the anchor assembly 10. In the illustrated embodiment the channels are formed by bracket structure at the back side of the mount base 404 that is unitary and monolithic with the back side of the mount base (e.g., molded as one piece), but it is recognized that a separately formed bracket element could be attached to the back of the mount for this purpose as described in more detail below. Referring to FIG. 12, each side channel 472 is formed by a pair of spaced apart channel walls 410, 412 that are angled in a manner similar to the angle of the side flanges of the anchor assembly. The channel angle Φ2 can be seen in FIG. 14, where the channel orientation is represented by dashed line 473. The sliding interaction of the channels 472 with the side flanges 160 of the flanges 160 produces a wedging action that pulls the mount base toward the wall as reflected by arrow 474 in FIG. 14. In the illustrated embodiment the wedging toward the wall is primarily achieved by rear surface portions on the flanges 160 (e.g., portion 167 shown in FIG. 1B) interacting on forward facing surface portions of the channels 472 (e.g., forward facing surface portion 473 of channel wall 412). In one example, the angle Φ1 of the side flanges of the anchor assembly and angle Φ2 of the side channels of the mount base are substantially the same, both being between about one degree and about ten degrees (e.g., between about 3 degrees and about 6 degrees), though variations are possible. Where the mount base 404 is made of a slightly resilient material (e.g., plastic) the mount base may flex somewhat to accommodate the wedging action, and to produce a very solid mounting of the mount base 404 against the wall surface. Even without any give in the mount base, the wedging action of the mount base against the wall produces a stable and reliable hold arrangement of the mount base 404 on the anchor assembly 10. The jaw-type action of the anchor assembly 10 resists the pull-out force caused by this wedging action.

Referring again to FIG. 12, each channel 472 may include a lead in guide wall 414 to help laterally align the mount base 404 with the side flanges of the anchor assembly as the mount base is engaged downwardly onto the anchor assembly. A stop wall 416 is provided at the top of each channel 472 to engage with the top side of the anchor assembly side flanges, acting as a limit for the downward engagement of the mount base 404 onto the anchor assembly.

As shown in FIG. 3A, and represented by acute non-zero angles Φ3, the lateral edges of the anchor assembly side flanges 160 may also be slightly offset from vertical 180 (in this case the side edges converging toward each when moving vertically upward). Each side channel 472 at the back side of the mount base 404 is also similarly angled as represented by non-zero angles Φ4 shown in FIG. 10. In one example, the lateral angle Φ3 of the side flanges of the anchor assembly and lateral angle Φ4 of the side channels of the mount base are substantially the same, both being between about one degree and about ten degrees (e.g., between about 3 degrees and about 6 degrees), though variations are possible. These cooperating angles enable an additional lateral wedging action as the rear channels 472 of a member (such as the hook unit 400) sliding engages downward onto the anchor assembly 10, which further increases the stability of the mounting of the member to the anchor assembly 10. The result is a dual wedging action, with the mounted member wedging against the front surface of the wall itself and also wedging laterally onto the flanges.

Figure 13:
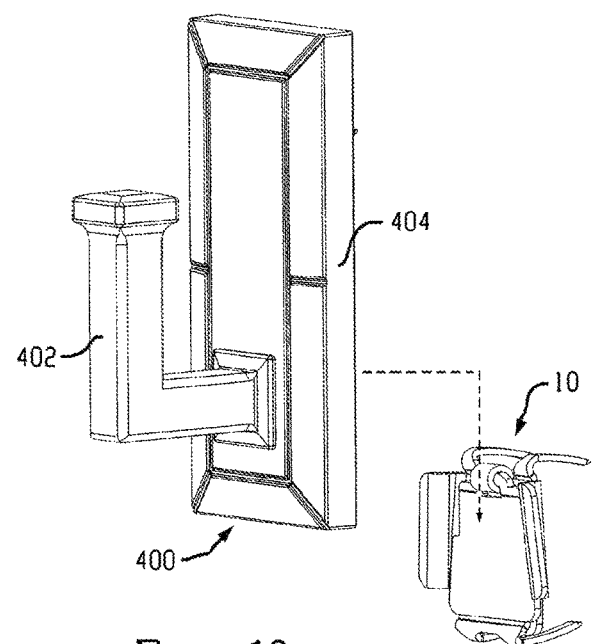

Referring to FIG. 13, the hook unit 400 (or other member) is simply moved rearwardly toward the anchor assembly 10 and then slides down over the anchor assembly 10 after the anchor assembly has been installed in a wall (not show) so that the flanges 160 enter the channels at the back of the mount base 404. In an alternative configuration the anchor assembly could be formed with a structure that rotationally interacts with the hook unit (or other member) to achieve the desired wedging of the member toward the wall surface.

Figure 15:
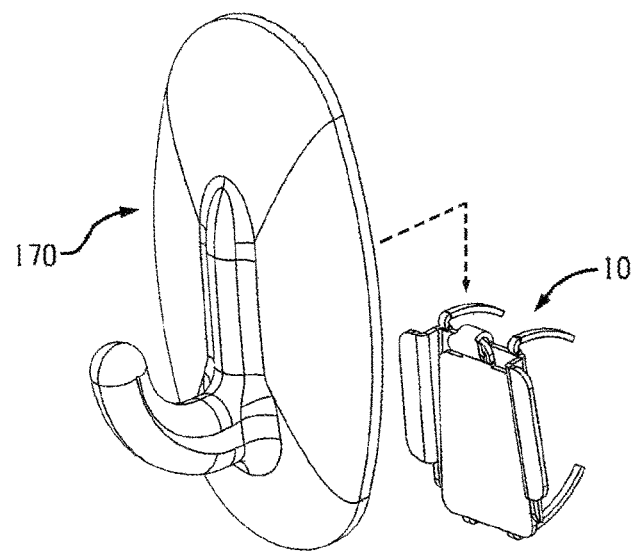
FIG. 15 shows another embodiment of a hook member mountable on the anchor assembly of FIG. 1A.

In the hook unit 400, the hook 402 is formed separately from the mount base 404 and connected thereto by a fastener 420. However, in other embodiments the hook and mount base could be formed as a monolithic structure (e.g., molded as a unit), such as the fashion hook 170 shown in FIG. 15.

Figure 16A:
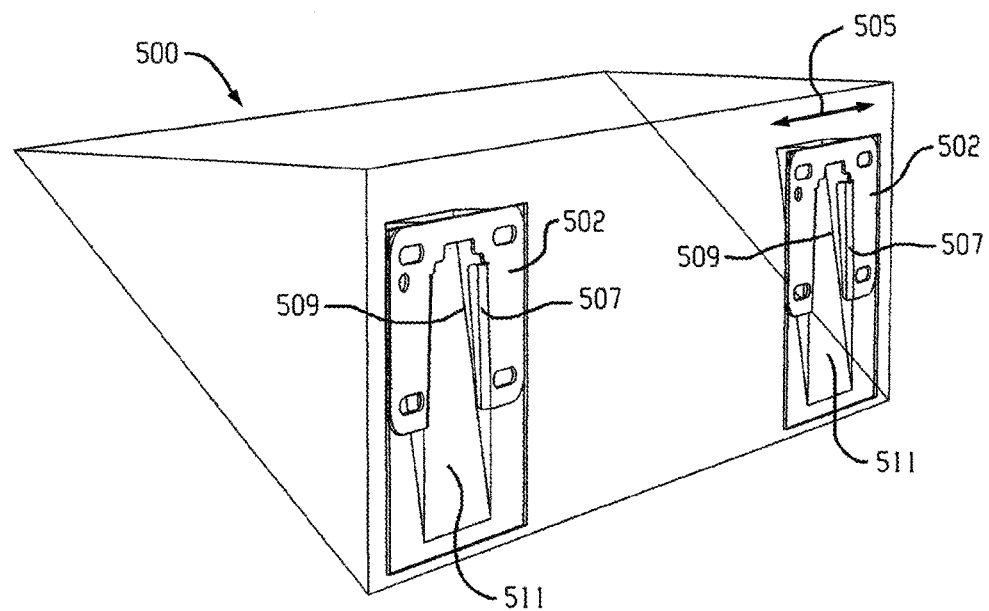
FIGS. 16A and 16B show one embodiment of a shelf member mountable on the anchor assembly of FIG. 1A.
Figure 16B:
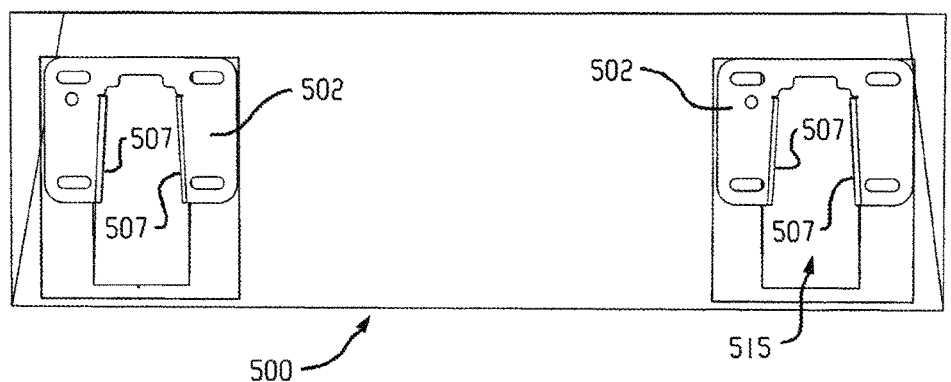

Of course, members other than hooks could be mounted to the anchor assembly 10. For example, referring to FIGS. 16A-16B a shelf structure 500 is shown in which the back of the shelf includes laterally spaced apart brackets 502 mounted thereto (shown in more detail in FIGS. 17A-17C). Each bracket is configured (e.g., having slots or forming such slots in combination with a recess at the back of the shelf) to slidingly engage the flanges 160 of laterally spaced apart anchor assemblies (not shown) that have been mounted to a wall. In the illustrated arrangement each bracket 502 includes spaced apart rearwardly turned flanges or lips 507 on either side of a mount channel 515 of the bracket. The flanges 507 terminate short of the inset side of the recess 511 in the back of the shelf so that depthwise slots 509 are formed between the flanges 507 and the recess 511. A wedging action similar to that described above may be achieved with such shelves as well. In this regard, to facilitate such wedging action and mating with the side flanges of the anchor assembly, the bracket flanges 507 may be angled toward each other slightly when moving vertically upward as best seen in FIG. 17A where acute non-zero angle α1 between each flange and the vertical axis 180 is shown, and the flanges may also be angled rearwardly slightly when moving vertically downward as best depicted in FIG. 17C by acute non-zero angle α2. Note that in the orientation of FIG. 17C the rearward or back side of the bracket 502 is at the left side. The brackets 502 are shown as separate structures that are attached to the back of the shelf, but could be unitary and monolithic brackets similar to that described above with respect to the hook unit 400. Moreover, where the brackets are separate elements that are connected to the shelf, one or both of the mount channel brackets 502 may be mounted in a manner that permits some lateral play of the bracket (e.g., represented by arrow 505) to facilitate situations where the anchor assemblies are not installed into the wallboard at a perfect lateral spacing.

Figure 19C:
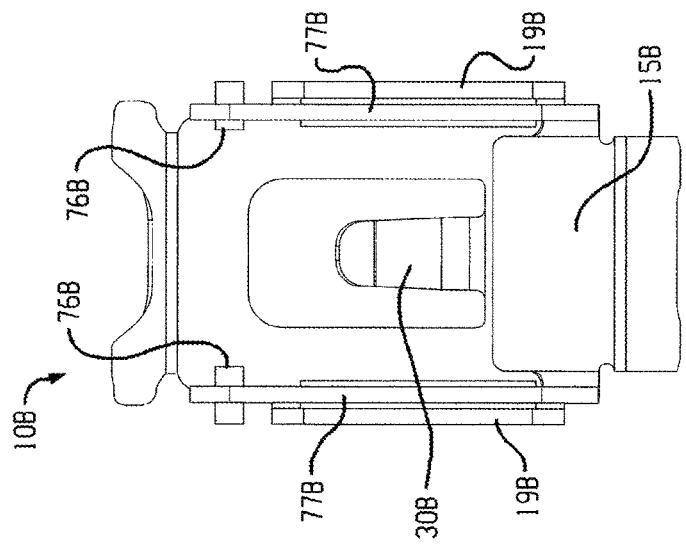
FIGS. 19A-19C show another embodiment of an anchor assembly.
Figure 19B:
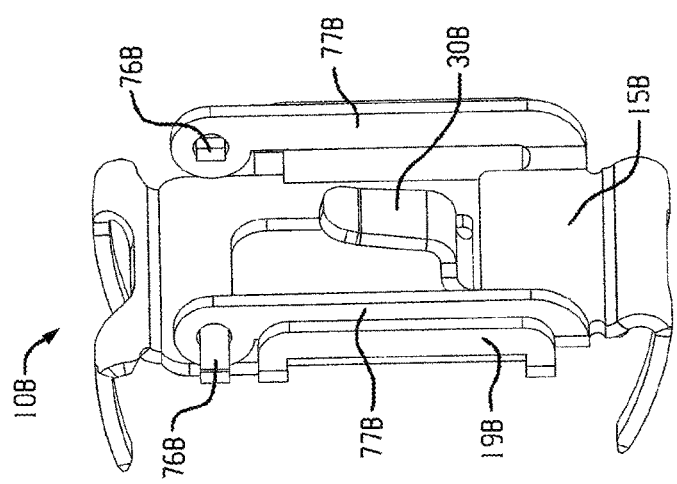
Figure 19A:
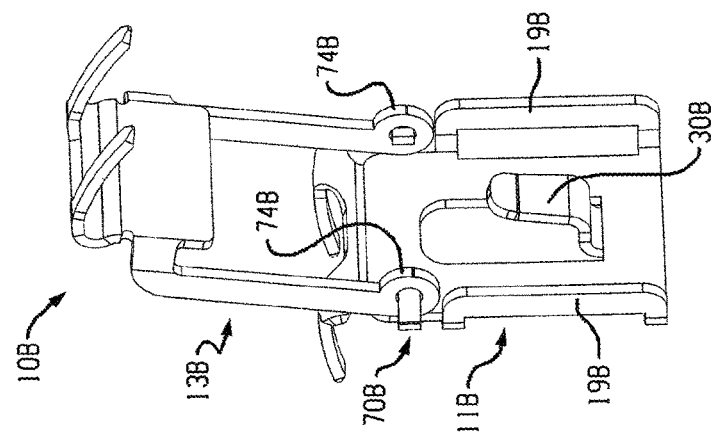
Figure 22:
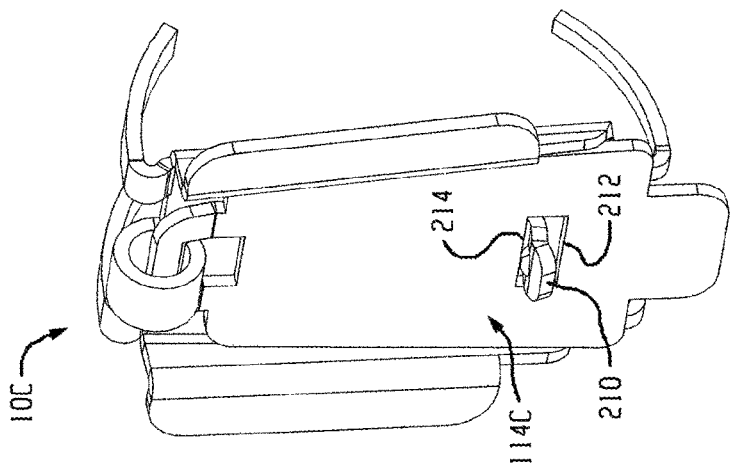
Figure 20:
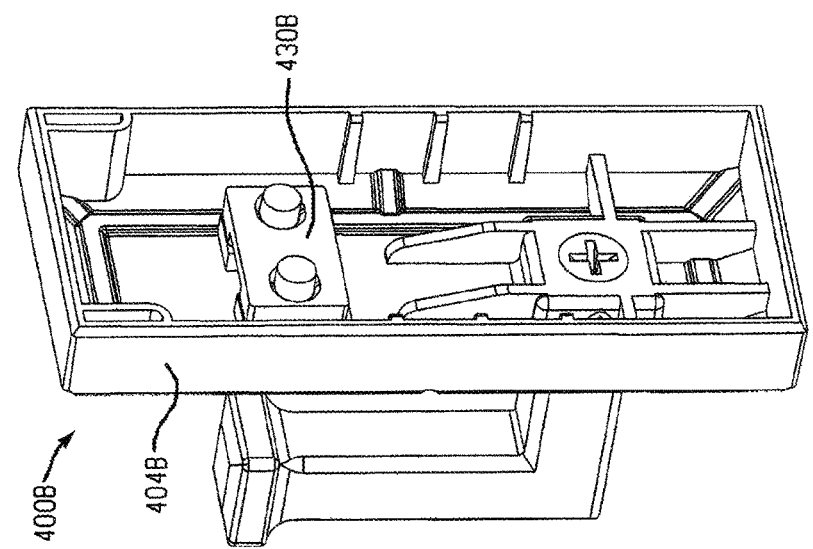
FIG. 20 shows an embodiment of a hook member mountable to the anchor assembly of FIG. 19A.
Figure 26:
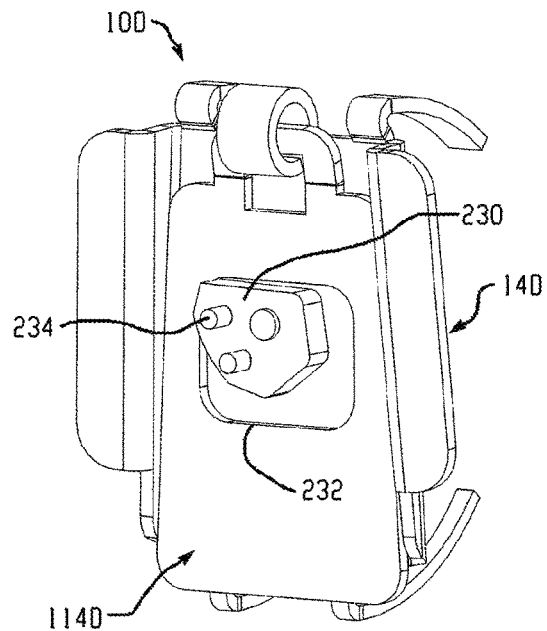
FIGS. 26-29 show another embodiment of an anchor assembly.
Figure 27:
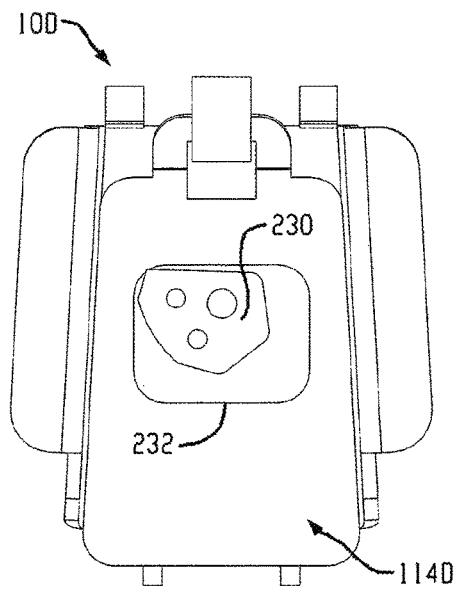
Figure 28:
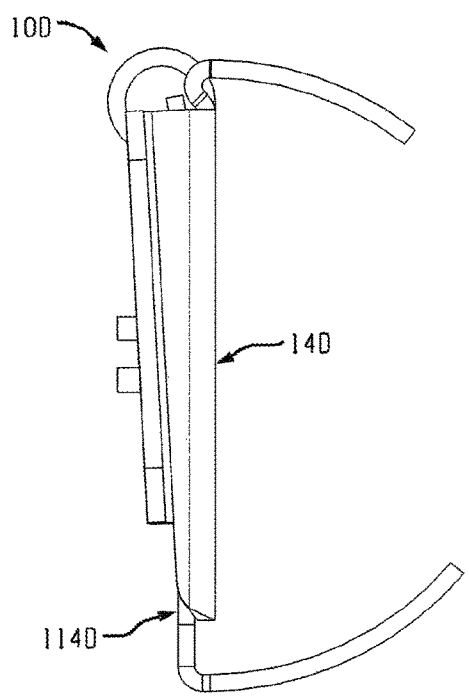
Figure 29:
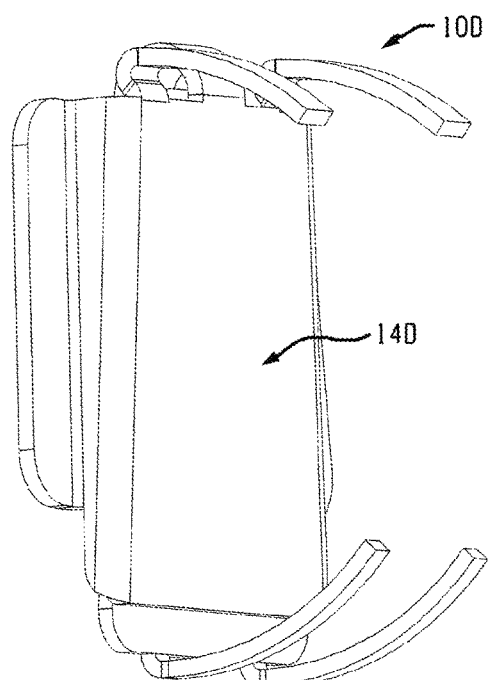
Figure 30:
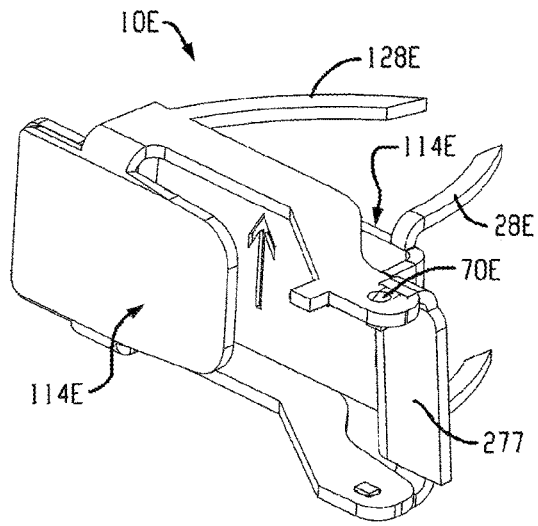
FIGS. 30-35 show another embodiment of an anchor assembly.
Figure 32:
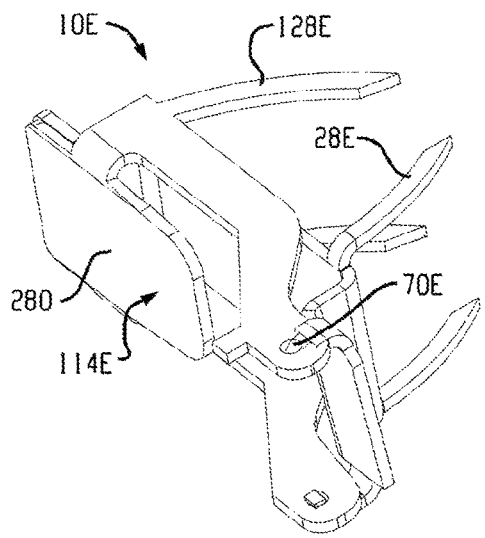
Figure 31:
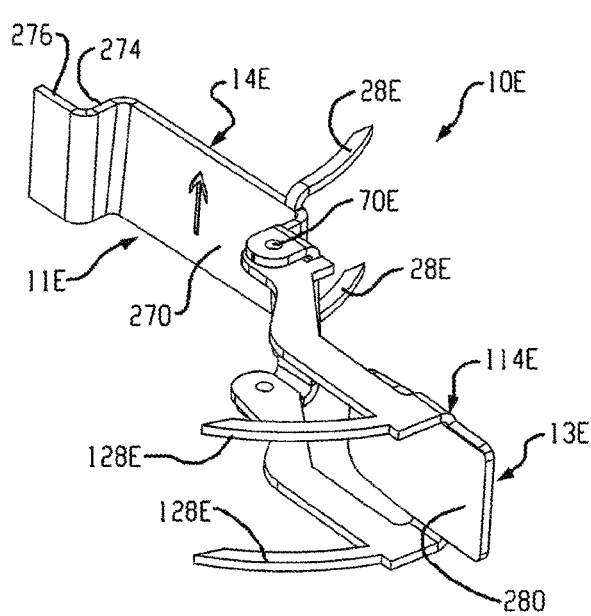
Figure 33:
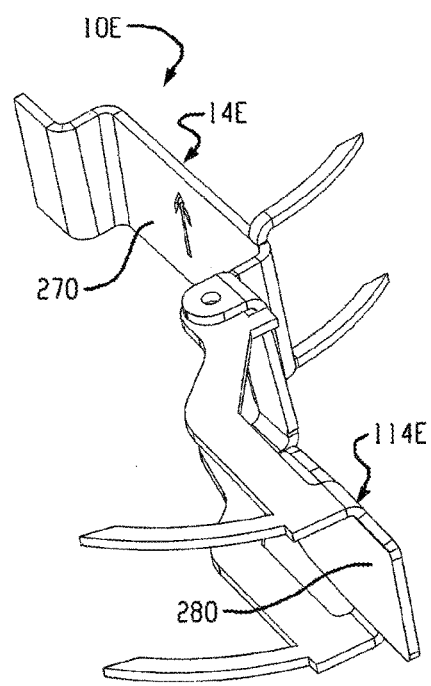

Referring now to FIGS. 19A-19C, another embodiment of an anchor assembly 10B is shown and includes anchor component 13B pivotably connected to anchor component 11B via a hinged connection 70B. The illustrated hinged connection 70B is formed by a pair of spaced apart hinge rings 74B on anchor component 13B and a pair of spaced apart hinge pins 76B on anchor component 11B, where each hinge pin 76B is engaged through a respective one of the hinge rings 74B. The anchor component 11B is of metal plate construction and each hinge pin 76B is formed by a strip of plate material with a forward bend and then a laterally inward bend. The anchor component 13B is also of metal plate construction and the hinge rings 74B are each formed at the distal end of a respective pivot arm 77B, where each pivot arm is formed by a forward bend of a strip of material that extends from a planar seating portion 15B of the anchor component base. The anchor component 11B also includes side rails 19B, which are also formed by forward bends of the plate material of the anchor component base. As seen in FIGS. 19B and 19C, the side rails 19B form a vertical channel in the base of the anchor component 11B into which the pivot arms 77B of the anchor component 13B move when the anchor component 13B is in its anchoring orientation. The anchor component 11B includes a forwardly protruding hook element 30B that passes forwardly into the U-shaped slot formed by spaced apart pivot legs 77B when anchor component 13B is in its anchoring orientation. The hook element 30B can be used to support a member on a wall, such as the hook unit 400B shown in FIG. 20, where the back side of the mount base 404B of the hook unit is recessed and includes a lateral hook engaging bracket 430B. The hook element 30B may be formed to protrude forward beyond the forward edges of the pivot arms 77B, or may alternatively by me more shallow so as to be recesses rearwardly of the forward edges of the pivot arms 77B. Where the hook element is recessed, the lateral dimension of the bracket 430B is small enough to fit between the lateral spacing defined by the pivot arms 77B. The hook element 30B may extend both forwardly and upwardly such that an interaction between the hook element 30B and the bracket 430B as the hook unit 400B is engaged downward onto the installed anchor assembly 10B pulls the hook unit 400B toward the wall surface to provide a wedging action.

Figure 21:
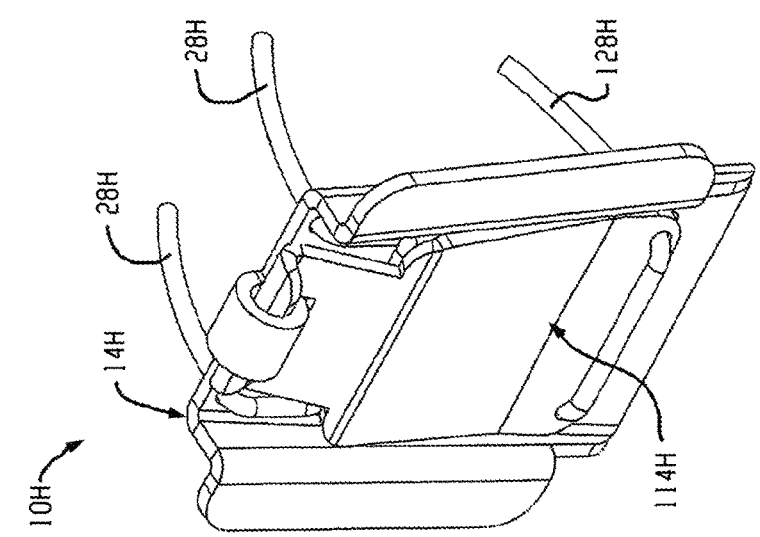
FIG. 21 shows another embodiment of an anchor assembly.

As mentioned above, other anchor assembly configurations are possible. Although the illustrated base plate and outer plate are contemplated as monolithic structures (e.g., produced by a progressive forming operation), the retainers could be formed separately (e.g., of wire form) and then attached to the respective plates. FIG. 21 shows an anchor assembly 10H (with angled side flanges similar to anchor assembly 10), where the retainers of the base plates 14H and 114H are initially formed as separate components of respective wire form members that make-up the retainers. In this case, a wire form member is connected to each base plate and includes one portion on the front of the respective plate and rearward extending retainer portions 28H and 128H that pass through openings in the respective plate, though individual retainers of wire could be used and end welded in their respective desired positions.

Referring now to FIGS. 22-25, another anchor assembly 10C is shown. In this anchor assembly a clamping feature is incorporated between the base plate 14C and the outer plate 114C so that when the outer plate is rotated downward over the base plate 14C, the clamping feature pulls the retainers 28C and 128C of the two plates vertically toward each other just before the outer plate 114C reaches its final install position. In particular, the base plate 14C includes a forward projecting tab 210 and the outer plate 114C includes an opening 212 that aligns with the tab 210. As the outer plate 114C is rotated down over the base plate 14C, the upper edge 214 of the opening 212 contacts an upper portion 216 of the tab. The tab and opening are configured and dimensioned such that the engagement of the two portions cause a relative, and slight vertical shift between the base plate 14C and outer plate 114C (e.g., the base plate is urged downward as represented by arrow 220 and the outer plate is urged upward as represented by arrow 222 in FIG. 22). It is contemplated that the total relative vertical shift between the two plates will be on the order of between about 1 mm and about 3 mm, but variations are possible. This vertical shift advantageously causes the anchor assembly 10C to grip the wall even tighter. Notably, the tab 210 and opening 212 may also include one or more detent features that function to resist rotation of the outer plate 114C away from the base plate 14C, further securing the position of the anchor assembly in a wall when installed.

It is recognized that other types of structures to achieve the relative vertical shift between the two plates are possible. By way of example, referring to the anchor assembly 10D of FIGS. 26-29, the base plate 14D includes a rotatable camming structure 230 that protrudes forward and passes through an opening 232 in the outer plate 114D when the outer plate achieves the illustrated install position. Rotation of the structure 230 creates an interaction with an edge portion of opening 232 to produce the relative vertical shift. The camming structure 230 may include tool features (e.g., a shape or projections 234) to enable a user to rotate the camming structure 230 for this purpose.

Figure 34:
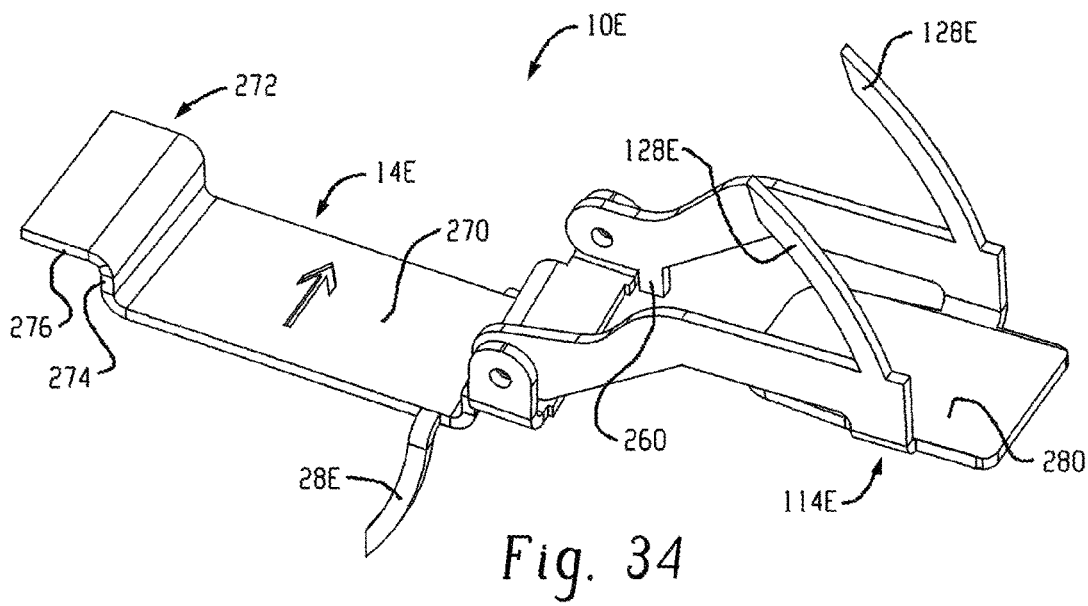
Figure 35:
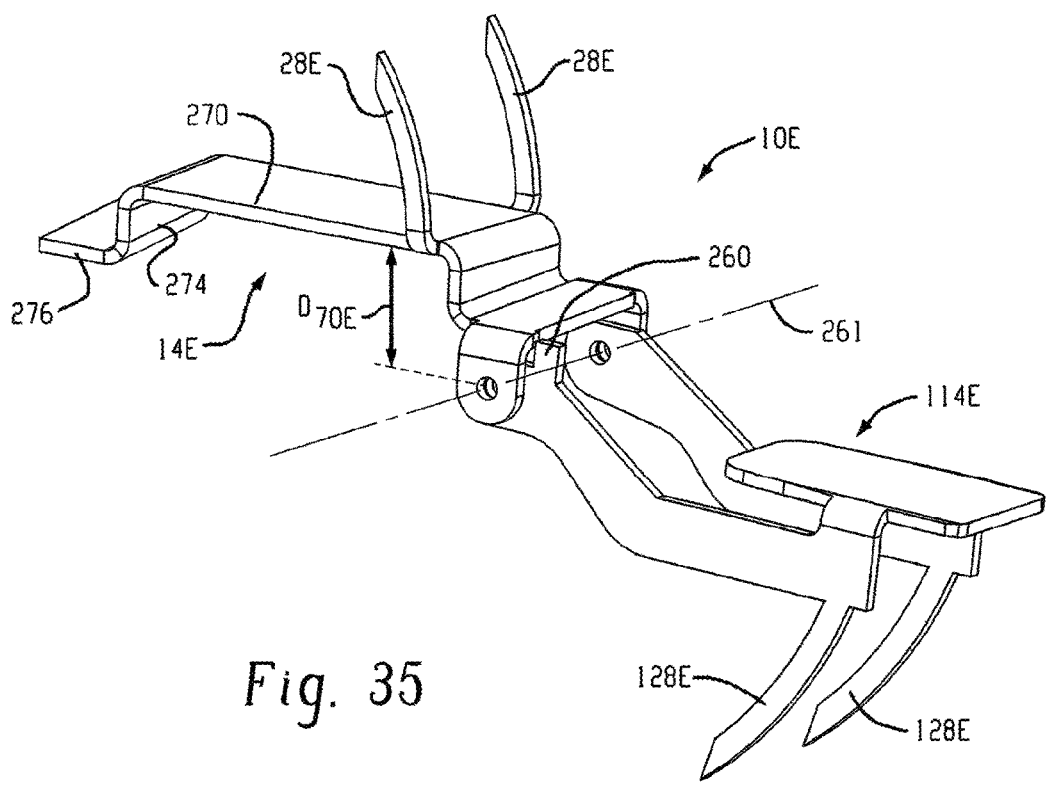

While the embodiments above primarily contemplate anchor assembly install orientations of a vertical type (i.e., where the wall penetrating retainers curve downward from the base plate and upward from the outer plate), it is recognized that anchor assemblies having a horizontal type install are also possible. By way of example, referring to FIGS. 30-35, an anchor assembly 10E is shown. The anchor assembly 10E includes an anchor component 11E with base plate 14E and an anchor component 13E with base or outer plate 114E that have a hinged connection 70E, which as suggested provides a vertically oriented axis of pivot between the two plates when installed. The retainers 28E and 128E of the plates curve laterally (and toward each other—creating a lateral bite into the wall 12) when the anchor is installed into the wall. Of note, the axis 261 of the hinge connection 70E is offset away from the wall contacting portion of the base plate (e.g., as reflected by distance $D_{70E}$ in FIG. 35). This offset makes the pivot angle of attack less than ninety degrees and improves self-locking due to application load. In one example the offset is at least 3 mm (such as at least 5 mm, or in some cases at least 7 mm) or at least 0.15 inches (such as at least 0.25 inches, or at least 0.40 inches). In one implementation, the hinge connection 70E may include a rotation stop feature 260 as shown. Referring to FIG. 34, the base plate 14E includes a major portion 270 for abutting the wall, and the free end of the base plate includes an L-shaped flange 272 formed by forwardly protruding segment 274 and lateral segment 276. Outer plate 114E includes a major portion 280 that rotates over the front side of the base plate and into proximity with the front side of segment 276.

Figure 36A:
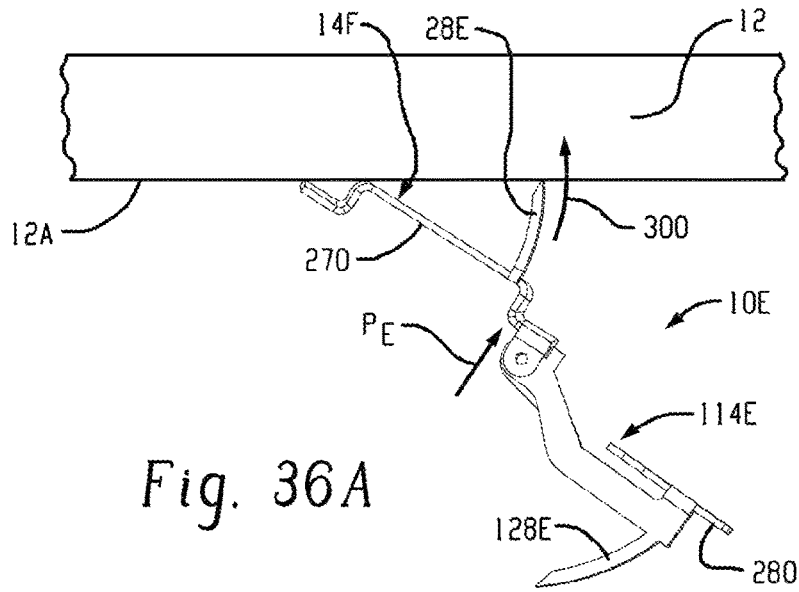
FIGS. 36A-36C show an install sequence of the anchor assembly of FIG. 30.
Figure 36B:
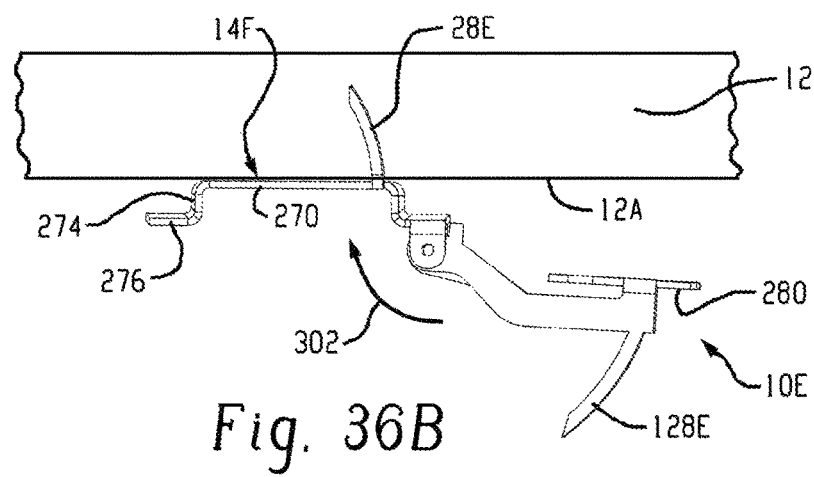
Figure 36C:
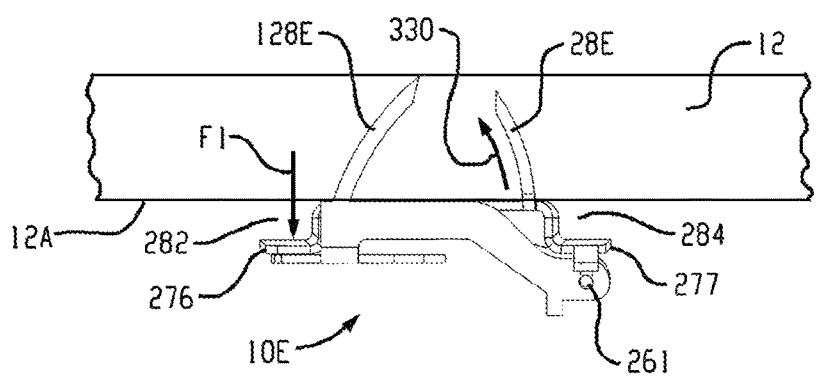

FIGS. 36A-36C show top plan views depicting the sequence of install of the anchor assembly 10E into a wall 12 in multiple stages. In stage 1 (FIG. 36A) the left side of major portion 270 of the base plate 14E is placed adjacent the wall surface 12A and the distal end of the retainers 28E are placed against the wall surface as shown, and the base plate retainers are rotated into the wall per arrow 300 via application of pressure $P_E$, resulting in the orientation shown in FIG. 36B. Next, the outer plate 114F is rotated over the top of the base plate per arrow 302 so that the distal end of retainers 128E contact the wall surface, and pressure is then applied to move the retainers 128E into the wall to achieve the final install orientation of FIG. 36C. In this embodiment it is contemplated that the center of the radius of curvature of the retainers 28 would be located along the corner of the base plate where major portion 270 and segment 274 meet each other, and the center point of the radius of curvature of the retainers 128E would be in line with the pivot axis 261 of the hinge connection. Notably, in the install orientation (e.g., FIG. 36C) a left edge of segment 276 is spaced from the wall and a similar right edge segment 277 is spaced from the wall 12, creating slots 282 and 284 (FIG. 36C) that can be used for mounting secondary components to the wall.

Figure 37:
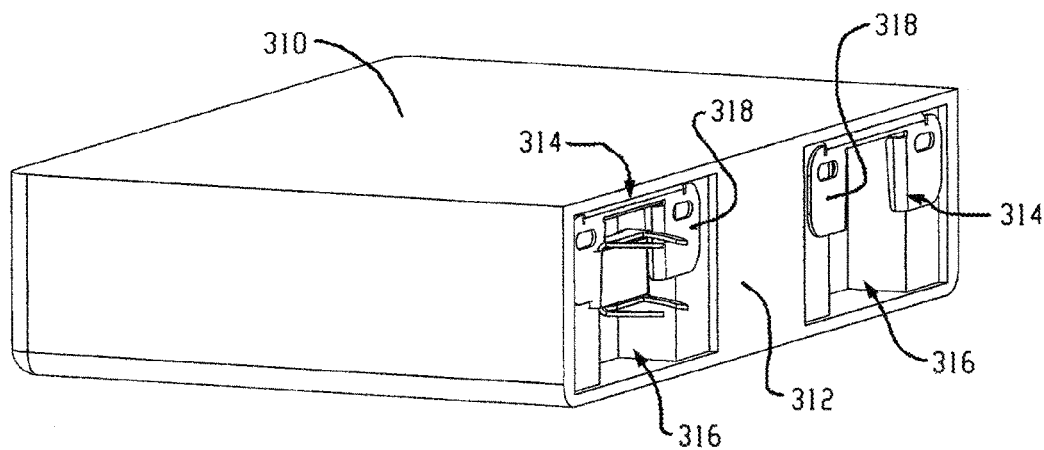
FIGS. 37-38 show a mountable component having a rear side multiple anchor engaging assemblies.
Figure 38:
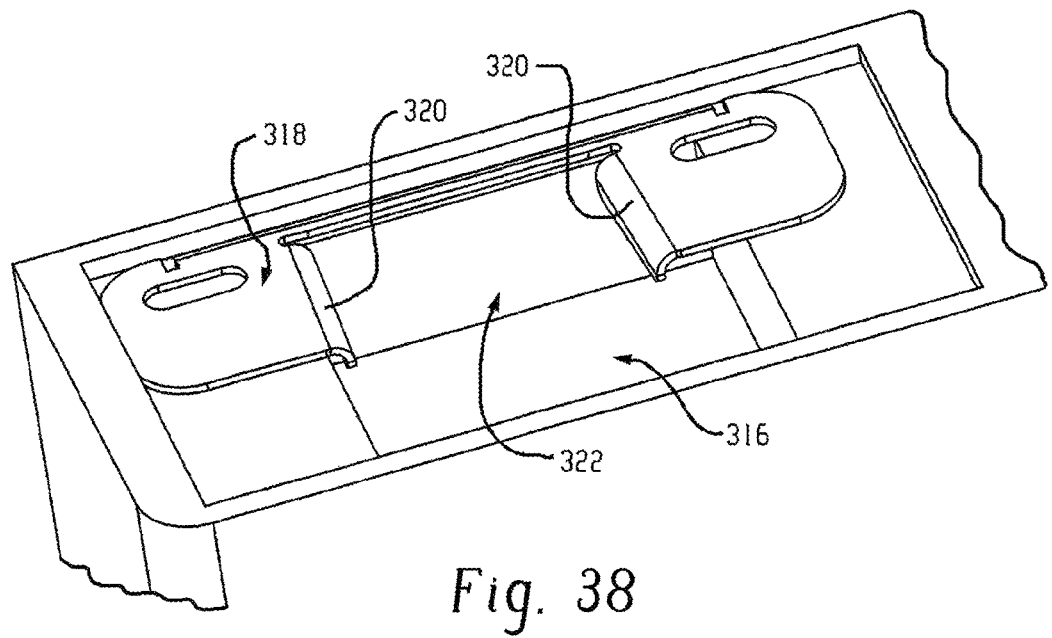

In this regard, reference is made to FIGS. 37 and 38 showing a component 310 (e.g., shelf, speaker or some other component) having a rear side 312 with one or more anchor engaging assemblies 314. In this case two assemblies 314 are shown and each is formed by a recess 316 in the rear side 312 along with a bracket 318 mounted in the recess. As shown, each bracket 318 includes oppose lips or flanges 320 (similar to flanges 207 mentioned above) forming a mount channel 322 therebetween. The flanges 320 are sized and spaced to slide into the slots 282, 284 (FIG. 36C) when the component 310 is slid vertically downward over the installed anchor assembly. The configuration of the brackets 314, lips 320 and slots 282, 284 may be such that the component is pulled or wedged toward the wall at install. The anchor edge segments 276 and 277 and/or the flanges 207 may be angled (e.g., as mentioned above) to facilitate mating and wedging of the component and anchor assemblies. When this wedging action occurs, is creates a force F1 (FIG. 36C) that tends to urge or rotate the base plate 14E into the wall in the vicinity of the retainers 28E per arrow 330, pinching the opposed retainers 28E and 128E together for a tighter grip within the wall. It is recognized that other components, such as hook 170, could readily install on the horizontal anchor assembly 10E as well. Moreover, the flanges 320 (or similarly flanges 507 discussed above) need not have a rearward turn as shown. Instead, in cases where the entire bracket is generally planar, the inset side of each recess 316 could be angled so that the flanges defined by the bracket at the lateral edges of the mount channel 322 have a rearward angle as a result of the orientation of the mount with the inset side of the recess.

Notably, in the illustrated embodiment the pivot axis 261 of the outer plate is displaced from the wall and major portion 270 of the base plate as indicated above. This arrangement provides for an install orientation in which the outer plate retainers 128E enter the wall 12 at a more aggressive angle (relative to the wall surface or wall contacting portions of the base plate) than the base plate retainers 28E as best seen in FIG. 36C. However, it is recognized that the pivot axis of the hinge connection of the two plates could be at other locations, such as closer to or on the surface of the major portion 270 of the base plate 14E.

In addition to the horizontal type install, it is also recognized that in some embodiments of the vertical type install it may be desirable to have the base plate retainers extend rearward and upward and to have the outer plate retainers extend rearward and downward. In such cases the anchor assembly may still include side flanges for mating with secondary components, where such side flanges angle rearwardly when moving vertically downward and angle toward each other when moving vertically upward.

Although the illustrated embodiments contemplate that members (e.g., such as hooks and shelves) are secured to an anchor assembly against removal by their angular interaction it is recognized that they could alternately made with non-angular mating features and employ snap or spring features to achieve the secure fit.

Figure 39:
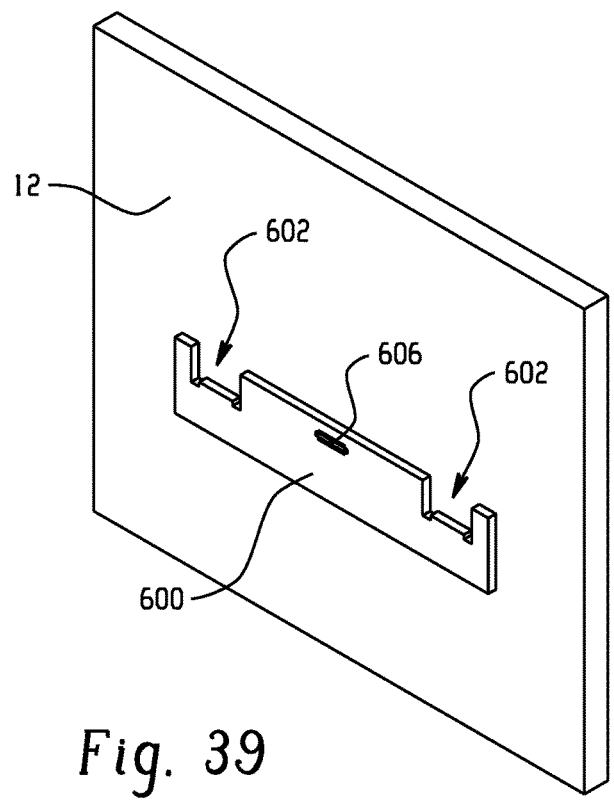
FIGS. 39-40 show an exemplary template system for use with anchor installation.
Figure 40:
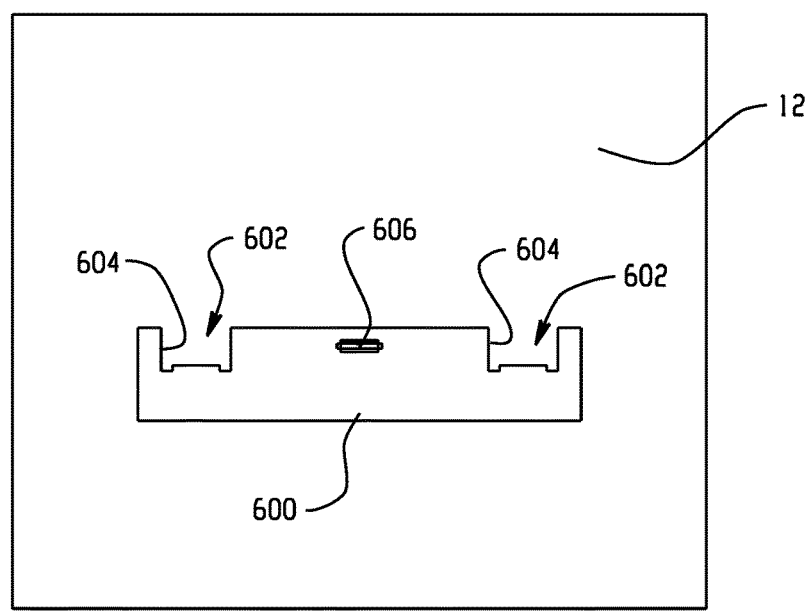

In reference to the method of anchor installation, it is also recognized that a template system could be employed in furtherance of anchor installation and would be particularly useful for installations that require more than one anchor assembly (i.e., where the secondary component mounts to more than one anchor assembly). In this regard, and referring to FIGS. 39-40 an exemplary template unit 600 is shown and includes spaced apart anchor receiving slots or other openings 602. Each slot 602 includes a lower edge or lateral edge or other portion configured to cooperate with part of the anchor assembly to define the install position for the anchor assembly. In the illustrated embodiment the template is configured for the anchor assembly 10E of FIGS. 30-31, and therefore a left lateral edge 604 of the slot 602 is used to define the install position for the anchor assembly (e.g., by placing the left corner or edge of the base plate against the edge 604 to set the initial install position of FIG. 36A). Then the installation sequence follows that described above. The template unit 600 may include an adhesive feature at its wall facing side (e.g., one or more adhesive areas covered by a tape that is removed so that the template unit 600 can be temporarily applied to the wall). The adhesive is sufficient to hold the template unit 600 on the wall 12, while at the same time facilitating relatively easy removal of the template unit 600 from the wall. Of course, in some cases the template could remain on the wall. As shown, the template unit 600 could incorporate an integrated level element 606 (e.g., a bubble level) so that when the template unit 600 is placed on the wall a user can assure that the two slots 602 are positioned in a manner that will enable mounting of anchor assemblies at the same height, resulting in a corresponding level mount of whatever component (e.g., elongated shelf or speaker) will thereafter be mounted onto the installed anchors.

Generally, the spacing between slots 602 would match the spacing between the mount structure at the back of the member to be installed on the wall. While only two slots 602 are shown, more slots could be provided if the component to be mounted is configured for mounting to a greater number of anchor assemblies. The template may be formed of any suitable die-cut material such as paper, cardboard or plastic sheet.

It is further contemplated that complete systems, which can be sold as a kit, could include multiple templates for multiple corresponding components to be mounted. For example, where a kit with multiple shelf members could include multiple corresponding templates along with the corresponding number of necessary anchor assemblies. Each template could generally be shaped and sized similar to that of its corresponding shelf so that when the template(s) is/are place on the wall they provide the user with a good view of what the shelf orientation on the wall will be.

The template system facilitates an install method that enables the end user to visually perceive and evaluate the desirability of the selected install location on a wall. In particular, a method of mounting first and second members (e.g., two shelves, or a shelf and a mirror) on a wall may involve: utilizing first and second template units, the first template unit having a profile shape substantially the same as a profile shape of the first member, the first template unit having at least one opening that defines at least a first wall anchor install location, the first template unit includes a wall side with one or more adhesive regions to enable the first template unit to be releasable mounted on the wall, the second template unit having a profile shape substantially the same as a profile shape of the second member, the second template unit having at least one opening that defines at least a first wall anchor install location, the second template unit includes a wall side with one or more adhesive regions to enable the second template unit to be releasable mounted on the wall; adhesively mounting the first template unit on the wall at a first potential location for mount of the first member; adhesively mounting the second template unit on the wall at a second potential location for mount of the second member; and viewing a relative location and orientation of each of the first template unit and the second template unit at a distance from the wall to evaluate whether the relative location and orientation is desired.

If the relative location and orientation is desired, the method further involves: mounting a first anchor (or anchors) at the first wall anchor install location defined by the first template unit; mounting a second anchor (or anchors) at the second wall anchor install location defined by the second template unit; engaging the first member to the first anchor such that the first member is mounted on the wall with the profile of the first member located substantially the same as the profile of the first template unit; and engaging the second member to the second anchor such that the second member is mounted on the wall with the profile of the second member located substantially the same as the profile of the second template unit. In one example, when the first member is engaged with the first anchor the first template unit is maintained on the wall and covered by the first member, and when the second member is engaged with the second anchor the second template unit is maintained on the wall and covered by the second member. In another example, the method involves removing the first template unit from the wall prior to engaging the first member to the first anchor, and removing the second template unit from the wall prior to engaging the second member to the second anchor.

If the relative location and orientation is not desired, the method further involves: repositioning at least one of the first template unit and/or the second template unit and repeating the viewing step until an achieved relative location and orientation is achieved and thereafter carrying out the anchor mounting and engaging operations:

It is to be clearly understood that the above description is intended by way of illustration and example only, is not intended to be taken by way of limitation, and that other changes and modifications are possible. For example, the anchor components could be formed with snap in place retainers (e.g., wire form retainers that snap into place on metal or plastic plate) or the anchor components could be produced using an overmold process (e.g., an overmold to connect retainers to a plastic plate or an overmold of the metal plate and retainer combination).

A variety of items can be supported on a wall by such anchor assemblies, including a hook, a clothing rack, a shadow box, a picture, a mirror, a shelf or an electronics device.

Figure 41:
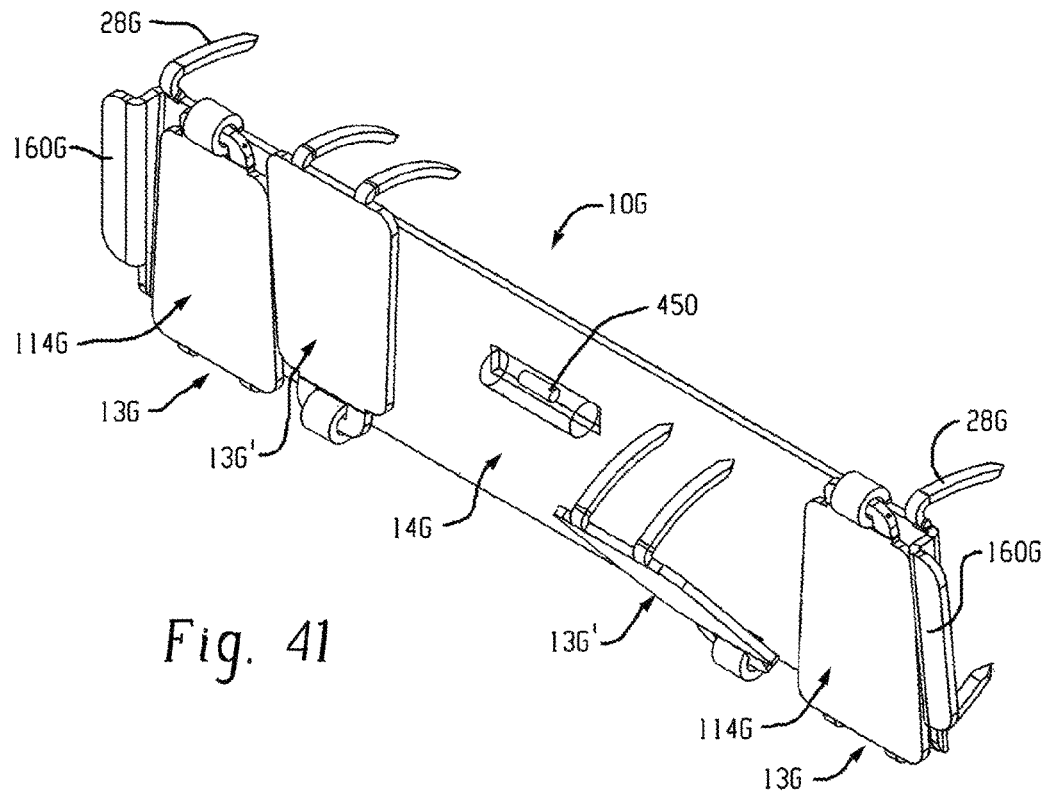
FIGS. 41-42 show another embodiment of an anchor assembly.
Figure 42:
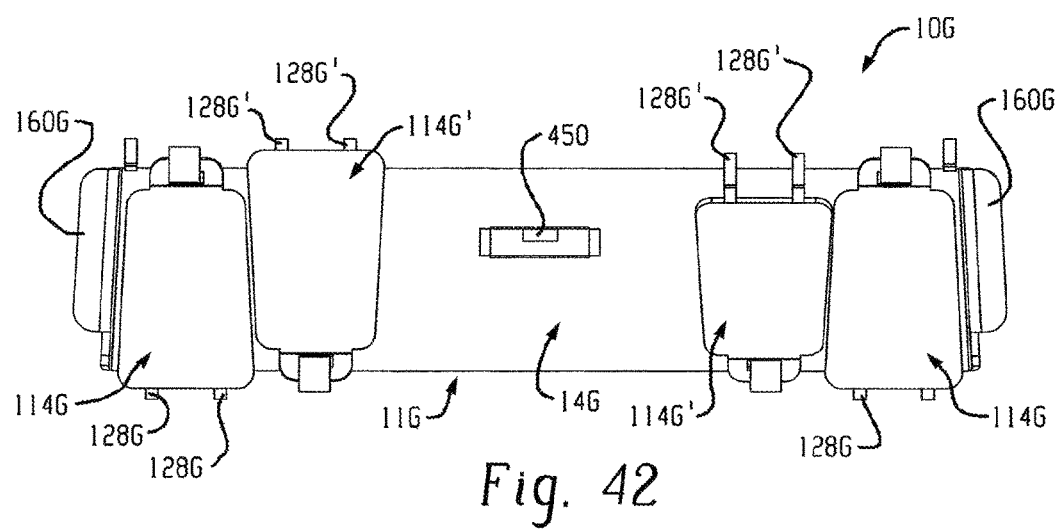

Moreover, while the embodiments shown above each a wall abutting anchor component with a single outer anchor component connected thereto, it is recognized that an elongated variation could have more anchor components, as suggested by the anchor assembly 10G shown in FIGS. 41-42. In the illustrated anchor assembly 10G, anchor component 11G includes an elongated base plate 14G includes two spaced apart wall penetrating retainers 28G. Multiple anchor components 13G are pivotably connected to (or otherwise associated with) the base plate 14G, including two outer components 13G pivotably (with base plates 114G) connected toward the top of the base plate 14G and two components 13G' (with base plates 114G') pivotably connected toward the bottom of the base plate. The outer or forward anchor components include retainers 128G and retainers 128G'. In this embodiment the install process would be in 5 penetration stages, one penetration stage to move the retainers of base plate 14G into the wall as a first step, and four additional penetration stages, one for movement of the retainers of each other plate into the wall. By adding additional outer plates, the overall loading on the anchor assembly (both normal to the wall and parallel to the wall) can be increased. The base plate 114G includes side flanges 160G than can be angled as described above. A level element 450 can also be incorporated into the anchor assembly as shown to facilitate achieving desired level install of the anchor assembly. Other configurations with multiple outer plates are also possible, including embodiments having only two outer plates, only three outer plates and different variations of the orientation of the retainers on the outer plates.

What is claimed is:

1. An anchor assembly for hanging an object on a wall, comprising:
   a first anchor component including a first base having front and back sides, at least one wall penetrating retainer extends from the first base and includes a wall penetrating extent that protrudes rearwardly of the first base and has a curved configuration;
   a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;
   wherein, when the second anchor component is in the anchoring orientation, the anchor assembly includes side flanges that taper laterally toward each other in a vertically upward direction for engaging with slots on secondary components that can be mounted to the anchor assembly.

2. The anchor assembly of claim 1 wherein, when the second anchor component is in the anchoring orientation, the side flanges angle rearwardly in a vertically downward direction.

3. The anchor assembly of claim 1 wherein the second anchor component is pivotably associated with the first anchor component by a hinge connection.

4. The anchor assembly of claim 3 wherein the hinge connection is formed by a pair of spaced apart hinge rings on the second anchor component and a pair of spaced apart hinge pins on the first anchor component, each hinge pin engaged through a respective one of the hinge rings.

5. A mount arrangement including the anchor assembly of claim 1, wherein:
   the anchor assembly is engaged with a wall with the second anchor component in the anchoring orientation;
   a secondary support member is engaged with the anchor assembly for support by the anchor assembly, wherein the secondary support member includes rear slots that interact with the side flanges on the anchor assembly to wedge a rear side of the secondary support member against a front surface of the wall.

6. The mount arrangement of claim 5 wherein the secondary support member is one of a hook, a clothing rack, a shadow box, a picture, a mirror, a shelf or an electronics device.

7. An anchor assembly for hanging an object on a wall, comprising:
   a first anchor component including a first base having front and back sides, at least one wall penetrating retainer extends from the first base and includes a wall penetrating extent that protrudes rearwardly of the first base and has a curved configuration;
   a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;
   wherein the second anchor component is pivotably associated with the first anchor component by a hinge connection;
   wherein the hinge connection is formed by a hinge loop on the first base, said hinge loop capturing a hinge link on the second base.

8. An anchor assembly for hanging an object on a wall, comprising:
   a first anchor component including a first base having front and back sides, at least one wall penetrating retainer extends from the first base and includes a wall penetrating extent that protrudes rearwardly of the first base and has a curved configuration;

a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the first base includes a vertically extending channel into which the second base fits when the second anchor component is in the anchoring orientation.

9. The anchor assembly of claim 8 wherein the first anchor component is of metal plate construction, the first base formed by a base plate, and the vertically extending channel is formed by spaced apart forward bends in the base plate.

10. The anchor assembly of claim 8 wherein a hook element extends forwardly from the base plate within the vertically extending channel, and the second base includes an opening or slot through which the hook element extends.

11. An anchor assembly for hanging an object on a wall, comprising:

a first anchor component including a first base having front and back sides, at least one wall penetrating retainer extends from the first base and includes a wall penetrating extent that protrudes rearwardly of the first base and has a curved configuration;

a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein first and second wall penetrating retainers extend from the first base, and third and fourth wall penetrating retainers extend from the second base, wherein a lateral spacing between the first and second wall penetrating retainers is different than a lateral spacing between the third and fourth wall penetrating retainers.

12. An anchor assembly for hanging an object on a wall, comprising:

a first anchor component including a first base having front and back sides, at least one wall penetrating retainer extends from the first base and includes a wall penetrating extent that protrudes rearwardly of the first base and has a curved configuration;

a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the wall penetrating extent of the first anchor component is arcuate, the wall penetrating extent of the second anchor component is arcuate, and a radius of curvature of the wall penetrating extent of the wall penetrating retainer of the second anchor component is different than a radius of curvature of the wall penetrating extent of the wall penetrating retainer of the first anchor component.

13. A mount arrangement including:

an anchor assembly for hanging an object on a wall, comprising:

a first anchor component including a first base having front and back sides, at least one wall penetrating retainer extends from the first base and includes a wall penetrating extent that protrudes rearwardly of the first base and has a curved configuration;

a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the anchor assembly is engaged with a wall with the second anchor component in the anchoring orientation;

a secondary support member is engaged with the anchor assembly for support by the anchor assembly, wherein the secondary support member includes rear structure that interacts with a structure on the anchor assembly to wedge a rear side of the secondary support member against a front surface of the wall;

wherein the structure on the anchor assembly is formed by at least one side flange that angles rearwardly in a downward vertical direction to slidingly engage with the rear structure on the secondary support member as the secondary support member is engaged downward over the anchor assembly.

14. A mount arrangement including:

an anchor assembly for hanging an object on a wall, comprising:

a first anchor component including a first base having front and back sides, at least one wall penetrating retainer extends from the first base and includes a wall penetrating extent that protrudes rearwardly of the first base and has a curved configuration;

a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the anchor assembly is engaged with a wall with the second anchor component in the anchoring orientation;

a secondary support member is engaged with the anchor assembly for support by the anchor assembly, wherein the secondary support member includes rear structure that interacts with a structure on the anchor assembly to wedge a rear side of the secondary support member against a front surface of the wall;

wherein the structure on the anchor assembly is formed by first and second spaced apart side flanges.

15. The mount arrangement of claim 14 wherein the spaced apart side flanges angle toward each other in a vertically upward direction.

16. The mount arrangement of claim 15 wherein the rear structure includes slots into which the side flanges are fit.

17. An anchor assembly for hanging an object on a wall, comprising:

a first anchor component including a first base having front and back sides, at least one wall penetrating retainer extends from the first base and includes a wall penetrating extent that protrudes rearwardly of the first base and has a curved configuration;

a second anchor component including a second base having front and back sides, the second anchor component pivotably associated with the first anchor component for movement between an anchoring orientation and a non-anchoring orientation to enable staged installation of the anchor assembly into a wall, at least one wall penetrating retainer extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein, when the second anchor component is in the anchoring orientation, the wall penetrating extent of the second anchor component achieves a more aggressive angle relative to a wall mount plane at the back side of the first base than the wall penetrating extent of the first anchor component.

18. An anchor assembly for hanging an object on a wall, comprising:

a first anchor component including a first base having front, back, top, bottom, left and right sides, at least one wall penetrating retainer extends from the first base and includes a wall penetrating extent that protrudes rearwardly of the first base and has a curved configuration;

a second anchor component including a second base having front, back, top, bottom, left and right sides, the second anchor component pivotably associated with the first anchor component for movement between an anchoring orientation and a non-anchoring orientation, in the anchoring orientation the second anchor component is positioned at least partly in front of the first anchor component, the second anchor component includes at least one wall penetrating retainer that extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein, when the second anchor component is in the anchoring orientation, the anchor assembly includes side flanges that taper laterally toward each other in a vertically upward direction for engaging with slots on secondary components that can be mounted to the anchor assembly.

19. The anchor assembly of claim 18 wherein, when the second anchor component is in the anchoring orientation, the side flanges angle rearwardly in a vertically downward direction.

20. The anchor assembly of claim 19 wherein the first anchor component is of metal plate construction, the first base formed by a base plate, the side flanges are formed at the left and right sides of the base plate, each side flange formed by a primarily forward bend and a primarily lateral bend in the base plate.

21. The anchor assembly of claim 18 wherein the second anchor component is pivotably associated with the first anchor component by a hinge connection.

22. The anchor assembly of claim 21 wherein the hinge connection is formed by a pair of spaced apart hinge rings on the second anchor component and a pair of spaced apart hinge pins on the first anchor component, each hinge pin engaged through a respective one of the hinge rings.

23. The anchor assembly of claim 18 wherein the wall penetrating retainer of the second anchor component passes below the bottom side of the first base when the second anchor component is in the anchoring orientation.

24. The anchor assembly of claim 18 wherein the wall penetrating extent of the first anchor component is arcuate and a center of a radius of curvature of the wall penetrating extent of the first anchor component is located substantially at a rear corner of the first base where the bottom side of the first base meets the back side of the first base, and the second anchor component is pivotably connected to the first anchor component by a hinge arrangement, the wall penetrating extent of the second anchor component is arcuate and a center of a radius of curvature of the wall penetrating extent of the second anchor component is located substantially at a hinge axis of the hinge arrangement.

25. The anchor assembly of claim 18 wherein the wall penetrating extent of the first anchor component is arcuate, the wall penetrating extent of the second anchor component is arcuate, and a radius of curvature of the wall penetrating extent of the wall penetrating retainer of the second anchor component is different than a radius of curvature of the wall penetrating extent of the wall penetrating retainer of the first anchor component.

26. The anchor assembly of claim 25 wherein the radius of curvature of the wall penetrating extent of the wall penetrating retainer of the second anchor component is less than the radius of curvature of the wall penetrating extent of the wall penetrating retainer first anchor component.

27. The anchor assembly of claim 18 wherein the second anchor component is pivotably associated with the first anchor component by a hinge connection, in the non-anchoring orientation the second anchor component extends upward and/or forward from the first anchor component, wherein the hinge connection includes a limit feature for retaining the second anchor component in the non-anchoring orientation unless an external force, beyond gravitational forces acting on the second anchor component, are applied.

28. The anchor assembly of claim 18, wherein:
   the first base is laterally elongated;
   the anchor assembly further includes:
      a third anchor component including a third base having front, back, top, bottom, left and right sides, at least one wall penetrating retainer extending from the third base and having a wall penetrating extent that protrudes rearwardly of the third base and has a curved configuration;
      the third anchor component is pivotably associated with the first anchor component for movement between an anchoring orientation and a non-anchoring orientation, in the anchoring orientation the third anchor component is positioned at least partly in front of the first anchor component and the wall penetrating extent of the third anchor component protrudes rearwardly of the first base, when the third anchor component is in the anchoring orientation the curved configuration of the wall penetrating extent of the third anchor component opposes the curved configuration of the wall penetrating extent of the first anchor component to form a jaw-type arrangement, in the non-anchoring orientation the third anchor component is pivoted away from the first anchor component;
   wherein the third anchor component is laterally spaced apart from the second anchor component and is pivotable relative to the first anchor component independently of pivot of the second anchor component.

29. The anchor assembly of claim 28, further comprising:
   a level element mounted to the base of the first anchor component.

30. A method of installing the anchor assembly of claim 18 into a wall, the method comprising:
   (a) placing the first anchor component adjacent a front surface of the wall with a distal end of the wall penetrating retainer of the first base in contact with the front surface and the bottom side of the base in contact with the front surface, with the second anchor component in the non-anchoring orientation;
   (b) applying pressure to the first base to rotate the wall penetrating retainer of the first base into the wall until the back side of the first base seats against the front surface of the wall; after steps (a) and (b),
   (c) pivoting the second anchor component toward the first anchor component until a distal end of the wall penetrating retainer of the second base comes into contact with the front surface of the wall; and
   (d) applying pressure to the second base to rotate the wall penetrating retainer of the second base into the wall.

31. The method of claim 30 wherein the second anchor component is rotated until the back side of the second base seats against the front side of the first base.

32. The method of claim 30 wherein the second anchor component is rotated until the second anchor component achieves a final install position.

33. An anchor assembly for hanging an object on a wall, comprising:
   a first anchor component including a first base having front, back, top, bottom, left and right sides, at least one wall penetrating retainer extends from the first base and includes a wall penetrating extent that protrudes rearwardly of the first base and has a curved configuration;
   a second anchor component including a second base having front, back, top, bottom, left and right sides, the second anchor component pivotably associated with the first anchor component for movement between an anchoring orientation and a non-anchoring orientation, in the anchoring orientation the second anchor component is positioned at least partly in front of the first anchor component, the second anchor component includes at least one wall penetrating retainer that extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;
   wherein, when the second anchor component is in the anchoring orientation, the anchor assembly includes left and right side flanges that are spaced from a wall mount plane defined by one or more portions of the back side of the first base, each side flange oriented at a lateral angle relative to an upright axis of the anchor assembly, each lateral angle between about one degree and about ten degrees.

34. The anchor assembly of claim 33, wherein, when the second anchor component is in the anchoring orientation, each side flange is oriented at a rearward angle, relative to the wall mount plane, each rearward angle between about one degree and about ten degrees.

35. An anchor assembly for hanging an object on a wall, comprising:
   a first anchor component including a first base having front, back, top, bottom, left and right sides, at least one wall penetrating retainer extends from the first base and includes a wall penetrating extent that protrudes rearwardly of the first base and has a curved configuration;
   a second anchor component including a second base having front, back, top, bottom, left and right sides, the second anchor component pivotably associated with the first anchor component for movement between an anchoring orientation and a non-anchoring orientation, in the anchoring orientation the second anchor component is positioned at least partly in front of the first anchor component, the second anchor component includes at least one wall penetrating retainer that extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the second anchor component is pivotably associated with the first anchor component by a hinge connection;

wherein the hinge connection is formed by a hinge loop on the top side of the first base and a hinge link at the top side of the second base.

36. An anchor assembly for hanging an object on a wall, comprising:

a first anchor component including a first base having front, back, top, bottom, left and right sides, at least one wall penetrating retainer extends from the first base and includes a wall penetrating extent that protrudes rearwardly of the first base and has a curved configuration;

a second anchor component including a second base having front, back, top, bottom, left and right sides, the second anchor component pivotably associated with the first anchor component for movement between an anchoring orientation and a non-anchoring orientation, in the anchoring orientation the second anchor component is positioned at least partly in front of the first anchor component, the second anchor component includes at least one wall penetrating retainer that extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the second anchor component is pivotably associated with the first anchor component by a hinge connection;

wherein an axis of the hinge connection runs parallel to a wall mount plane defined by one or more portions of the back side of the first base.

37. The anchor assembly of claim 36 wherein the axis of the hinge connection is spaced forwardly of the wall mount plane by a distance of at least 0.15 inches.

38. The anchor assembly of claim 36 wherein the axis of the hinge connection is spaced forwardly of the wall mount plane by a distance of at least 0.25 inches.

39. An anchor assembly for hanging an object on a wall, comprising:

a first anchor component including a first base having front, back, top, bottom, left and right sides, at least one wall penetrating retainer extends from the first base and includes a wall penetrating extent that protrudes rearwardly of the first base and has a curved configuration;

a second anchor component including a second base having front, back, top, bottom, left and right sides, the second anchor component pivotably associated with the first anchor component for movement between an anchoring orientation and a non-anchoring orientation, in the anchoring orientation the second anchor component is positioned at least partly in front of the first anchor component, the second anchor component includes at least one wall penetrating retainer that extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the first base includes a vertically extending channel into which the second base fits when the second anchor component is in the anchoring orientation.

40. The anchor assembly of claim 39 wherein the first anchor component is of metal plate construction, the first base formed by a base plate, and the vertically extending channel is formed by spaced apart forward bends in the base plate.

41. The anchor assembly of claim 40 wherein a hook element extends forwardly from the base plate within the vertically extending channel, and the second base includes an opening or slot through which the hook element extends.

42. An anchor assembly for hanging an object on a wall, comprising:

a first anchor component including a first base having front, back, top, bottom, left and right sides, at least one wall penetrating retainer extends from the first base and includes a wall penetrating extent that protrudes rearwardly of the first base and has a curved configuration;

a second anchor component including a second base having front, back, top, bottom, left and right sides, the second anchor component pivotably associated with the first anchor component for movement between an anchoring orientation and a non-anchoring orientation, in the anchoring orientation the second anchor component is positioned at least partly in front of the first anchor component, the second anchor component includes at least one wall penetrating retainer that extends from the second base and includes a wall penetrating extent that protrudes rearwardly of the second base and has a curved configuration, when the second anchor component is in the anchoring orientation the curved configuration of the wall penetrating extent of the second anchor component opposes the curved configuration of the wall penetrating extent of the first anchor component to form a jaw-type arrangement;

wherein the first anchor component is of metal plate construction, the first base formed by a first base plate, the second anchor component is formed of metal plate construction, the second base formed by a second base plate, and the back side of the second base plate seats against the front side of the first base plate when the second anchor component is in the anchoring orientation.

43. The anchor assembly of claim 42 wherein the back side of the second base plate contacts the front side of the first base plate in one or more discrete locations for purposes of the back side of the second base plate seating against the front side of the first base plate when the second anchor component is in the anchoring orientation.

* * * * *